US 6,598,886 B2

(12) United States Patent
Baird et al.

(10) Patent No.: US 6,598,886 B2
(45) Date of Patent: Jul. 29, 2003

(54) POWERED TRAILER JACKING SYSTEM

(76) Inventors: Darryl W. Baird, 363 Montague Street, Albert Park, Victoria 3206 (AU); Geoffrey R. Watson, C/o 24 Huthinson Road, Yarra Glen, Victoria 3775 (AU)

( * ) Notice: Subject to any disclaimer, the term of this patent is extended or adjusted under 35 U.S.C. 154(b) by 0 days.

(21) Appl. No.: 09/855,752

(22) Filed: May 16, 2001

(65) Prior Publication Data

US 2001/0054815 A1 Dec. 27, 2001

Related U.S. Application Data

(63) Continuation-in-part of application No. 09/787,711, filed as application No. PCT/AU00/00153 on Mar. 6, 2000, now abandoned.

(30) Foreign Application Priority Data

| Mar. 4, 1999 | (AU) | ............................................. PP 8993 |
| Jul. 2, 1999 | (AU) | ............................................. PQ 1365 |

(51) Int. Cl.[7] ................................................. B60S 9/04
(52) U.S. Cl. ............................... 280/6.155; 280/766.1; 254/419; 254/425
(58) Field of Search ........................... 280/766.1, 763.1, 280/6.153, 6.155, 764.1; 254/419, 425

(56) References Cited

U.S. PATENT DOCUMENTS

| 3,402,915 | A | * | 9/1968 | Dalton | ...................... 254/419 |
| 4,097,840 | A | | 6/1978 | Chappelle | |
| 4,129,322 | A | * | 12/1978 | Kuntz, Jr. | .................... 254/419 |
| 4,187,733 | A | | 2/1980 | Walther et al. | |
| 4,466,637 | A | * | 8/1984 | Nelson | ........................ 254/419 |
| 4,522,375 | A | * | 6/1985 | Howell | ....................... 254/425 |
| 4,635,904 | A | * | 1/1987 | Whittingham | ........... 192/56.62 |
| 4,863,184 | A | * | 9/1989 | Mena | ......................... 212/303 |
| 5,050,845 | A | * | 9/1991 | Aline et al. | ................. 254/419 |
| 5,314,201 | A | * | 5/1994 | Wessels | ..................... 180/209 |
| 5,451,076 | A | * | 9/1995 | Burkhead | .................... 280/475 |
| 5,911,437 | A | * | 6/1999 | Lawrence | ................... 254/419 |
| 6,224,103 | B1 | * | 5/2001 | Hatcher | ..................... 254/419 |

FOREIGN PATENT DOCUMENTS

| AU | 24773/84 | 2/1984 |

* cited by examiner

Primary Examiner—Paul N. Dickson
Assistant Examiner—Laura B. Rosenberg
(74) Attorney, Agent, or Firm—Larson & Taylor, PLC

(57) ABSTRACT

A demountable drive mechanism for the landing gear of a semi-trailer, the landing gear including legs that are extendable and retractable by rotation of a drive shaft through a gear mechanism, the drive shaft being axially displaceable to change the ratio of the gear mechanism, the drive mechanism comprising an electric motor having an output shaft adapted to be coupled to the drive shaft of the landing gear assembly, the electric motor being coupled to the landing gear through a torque arm so that the electric motor can impart torque to the drive shaft, means to axially displace the drive shaft to change the gear ratio, and means to control operation of the electric motor and axial displacement of the drive shaft.

24 Claims, 15 Drawing Sheets

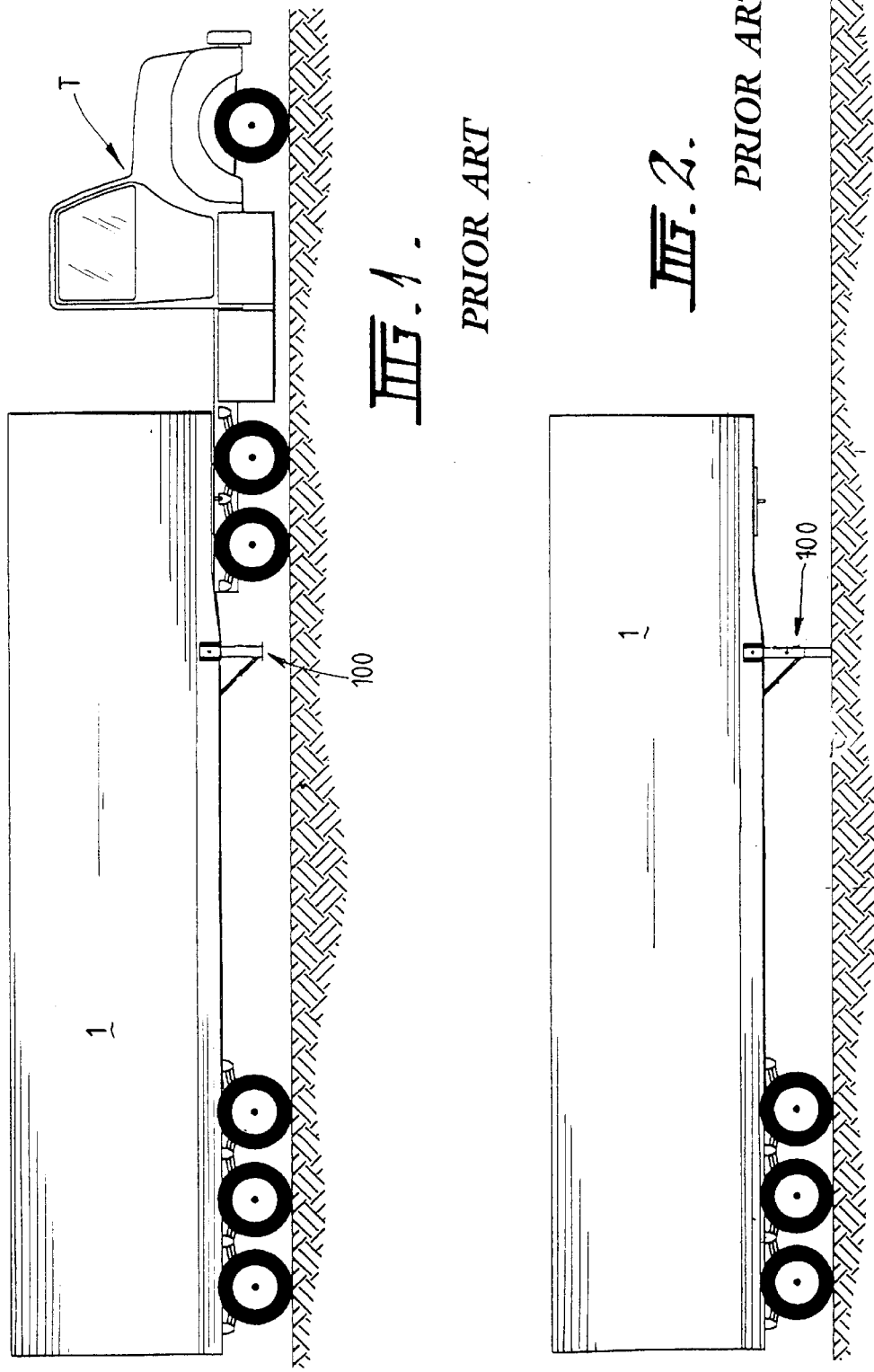

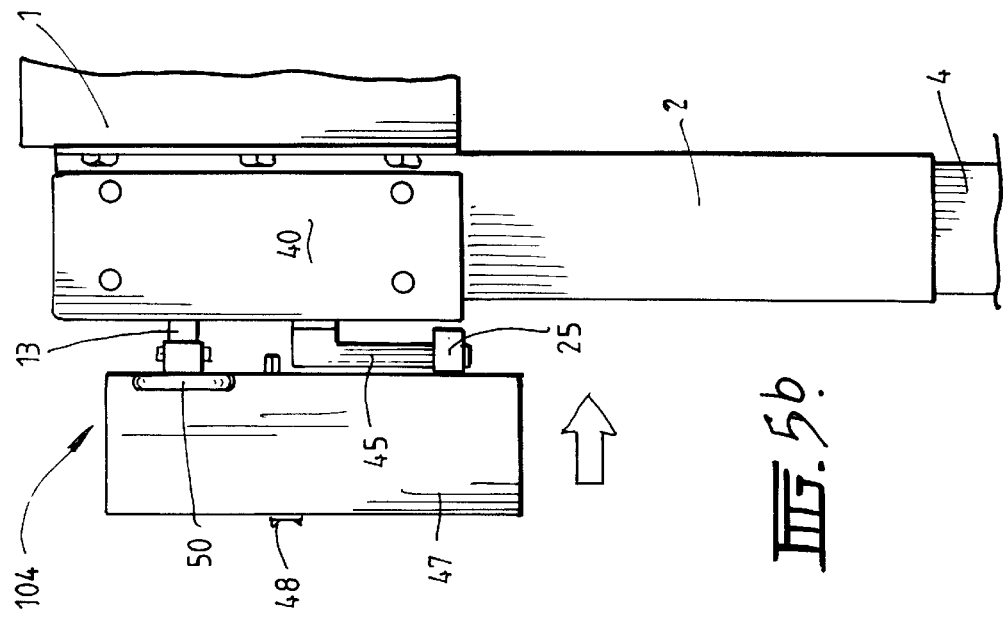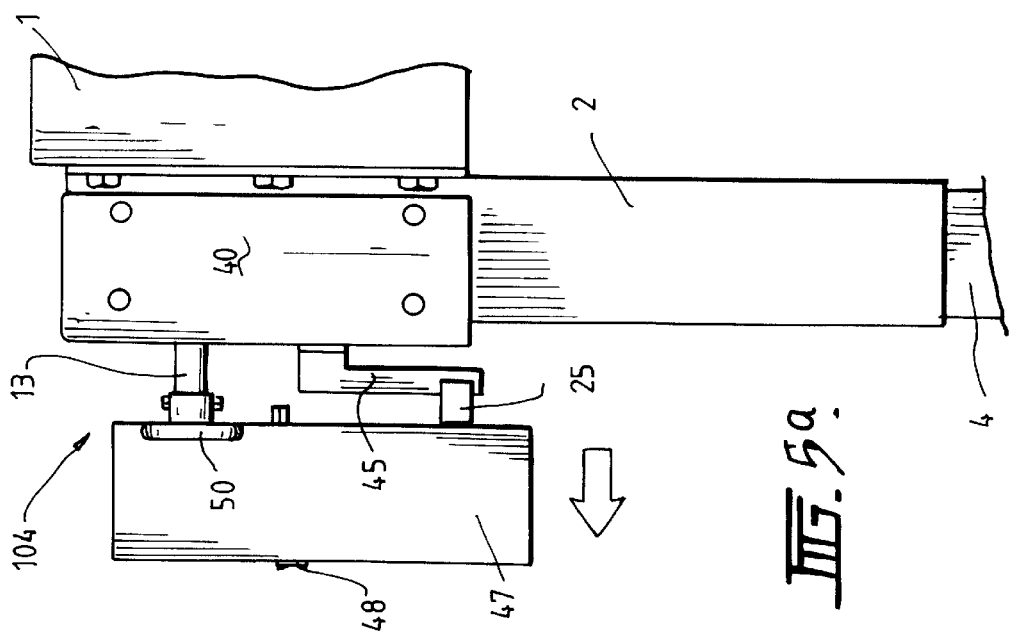

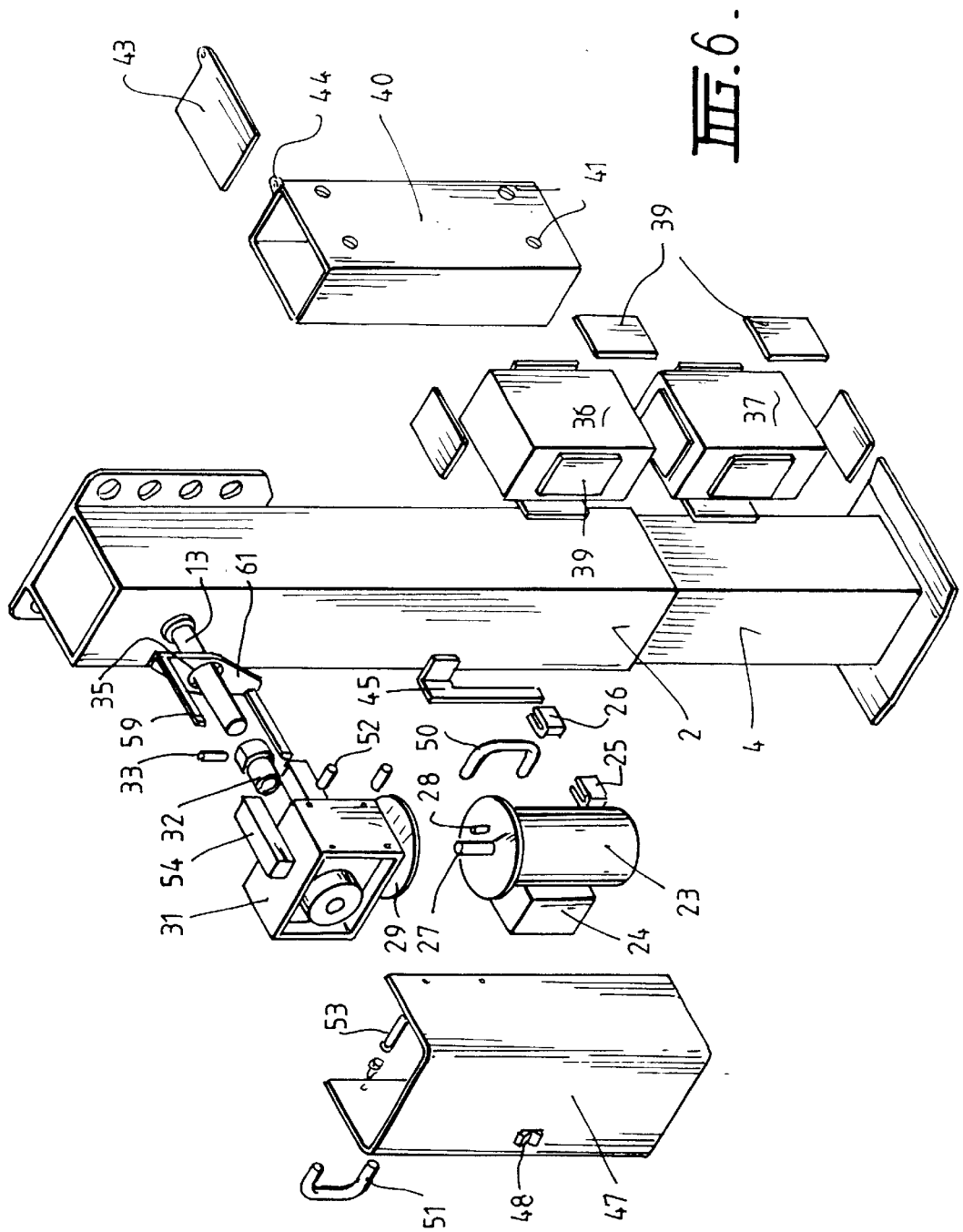

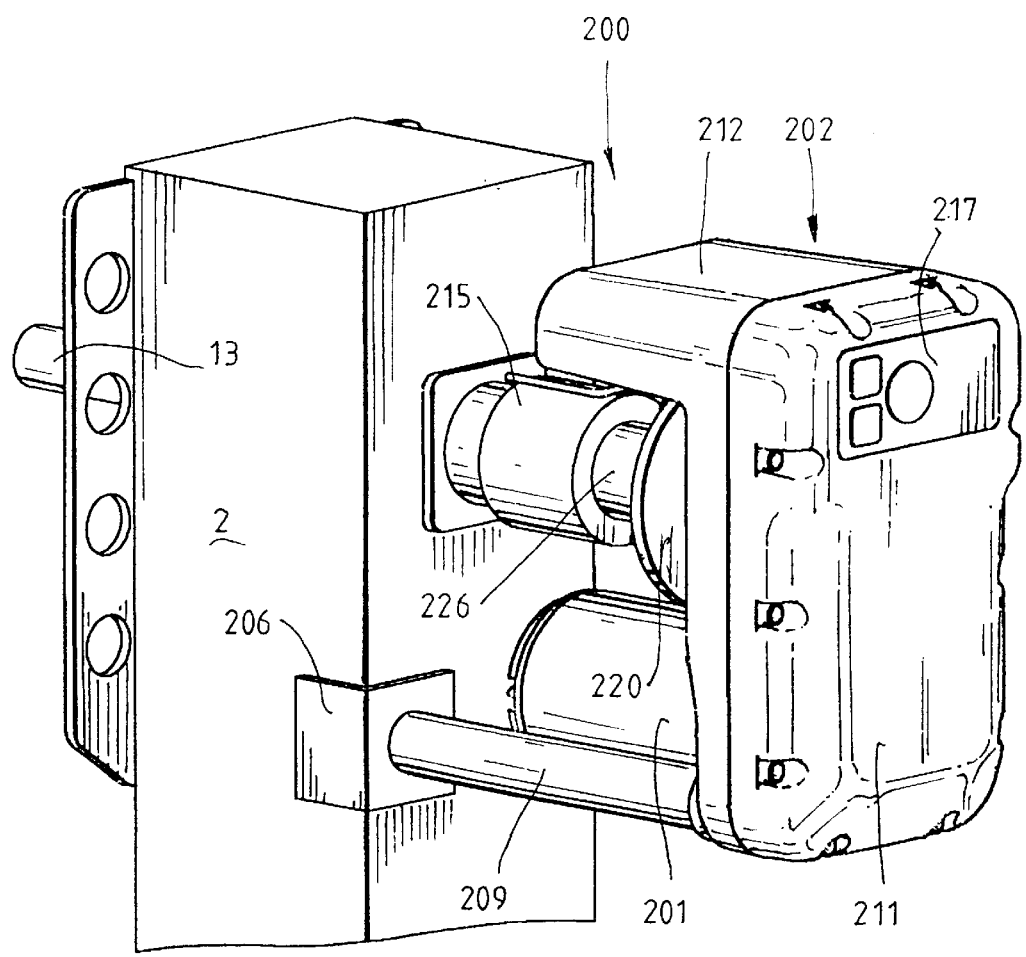
FIG_8_

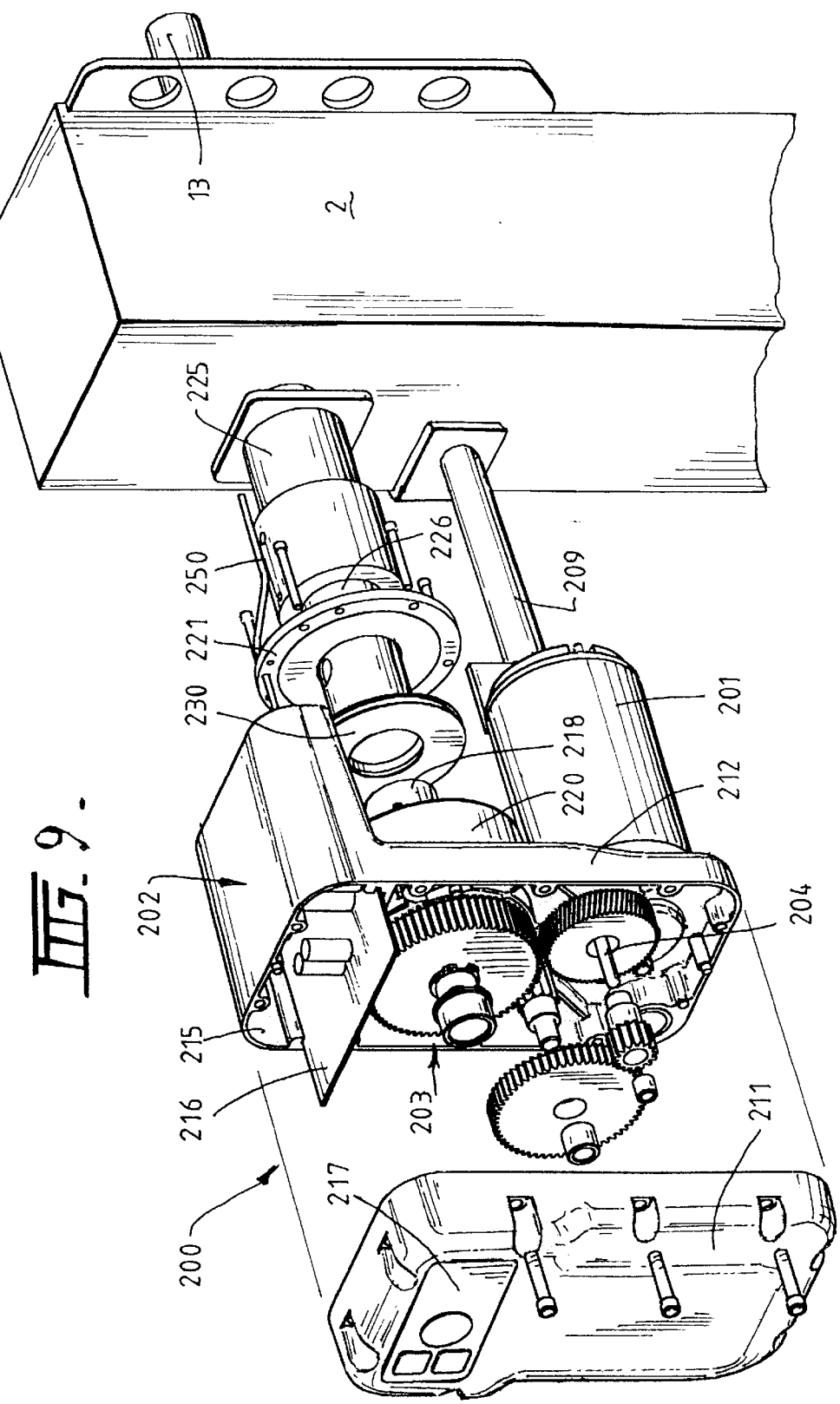

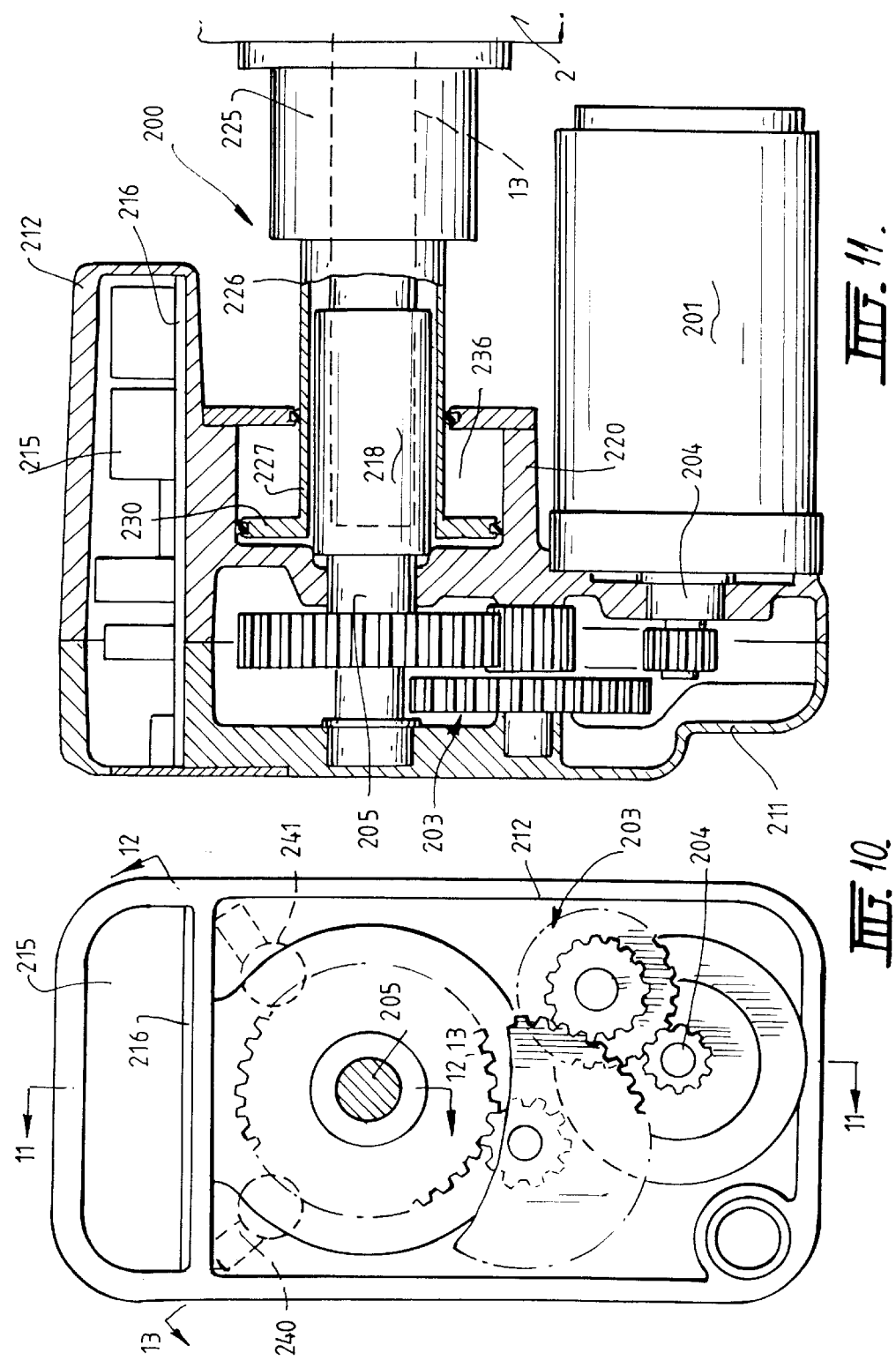

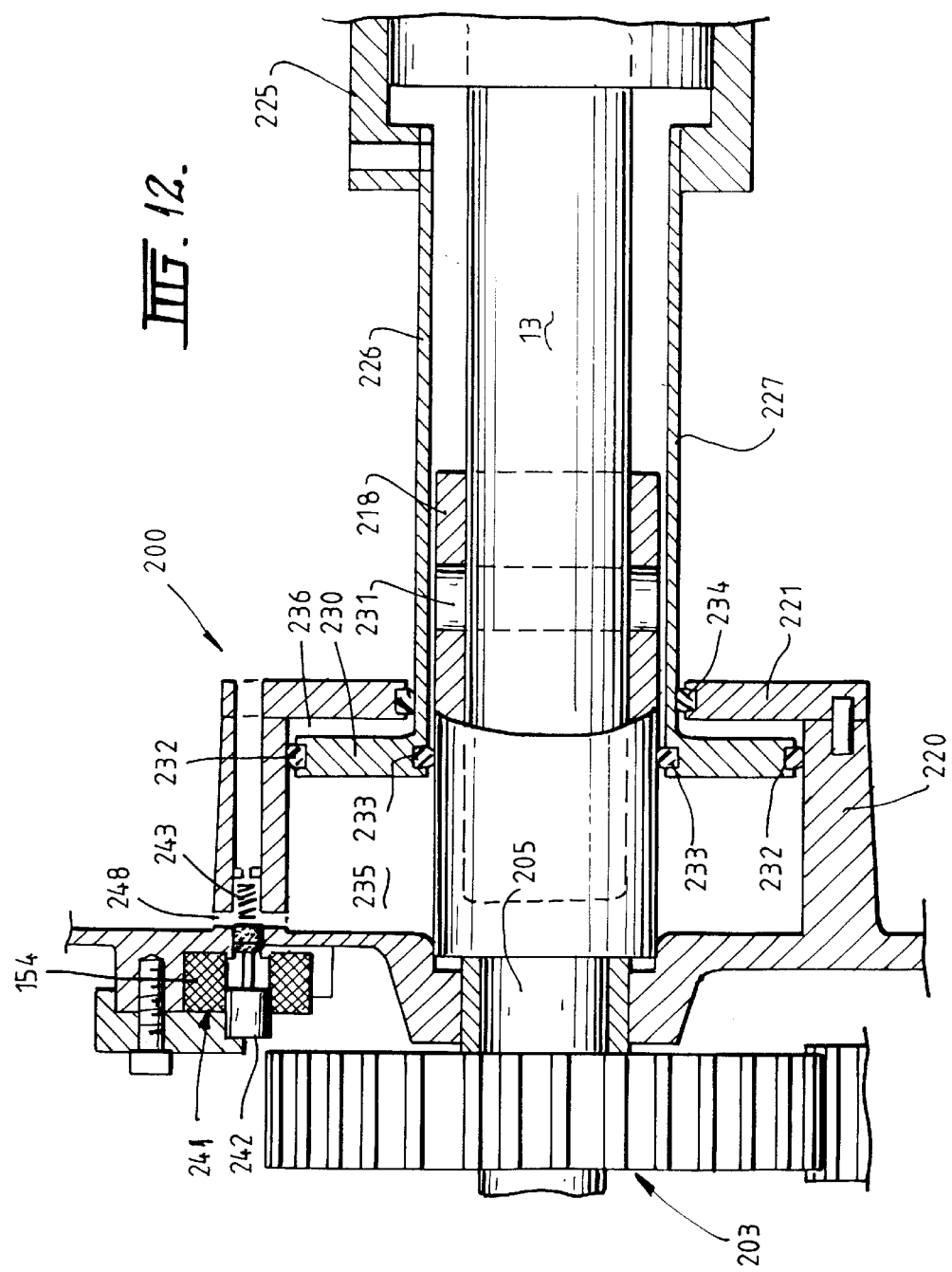

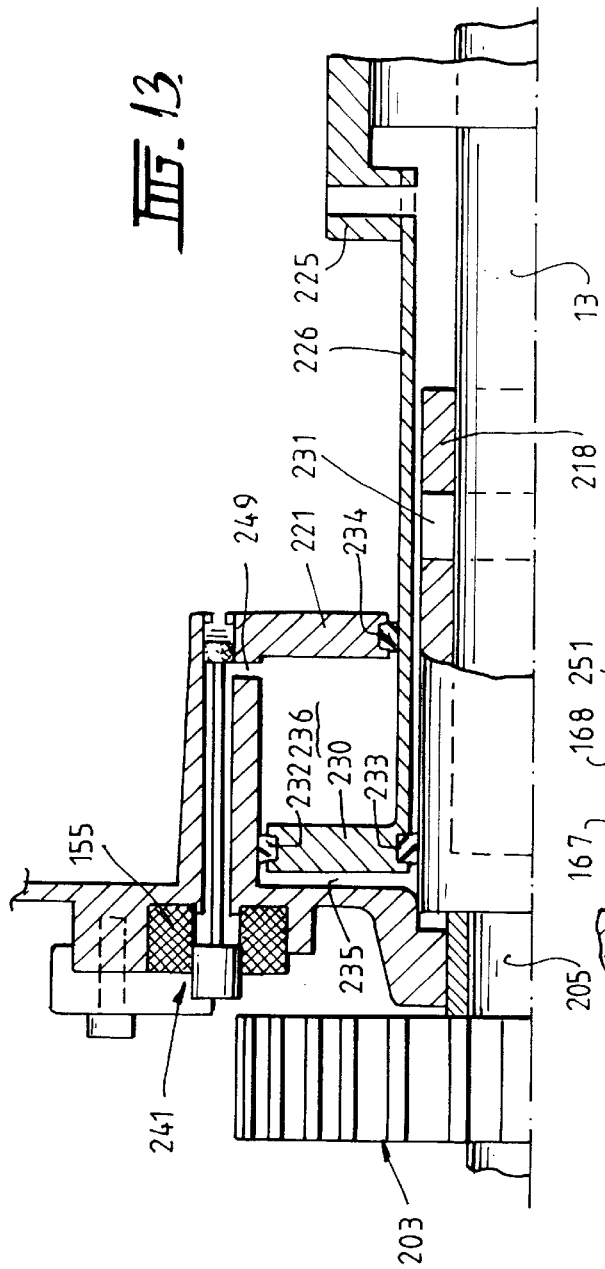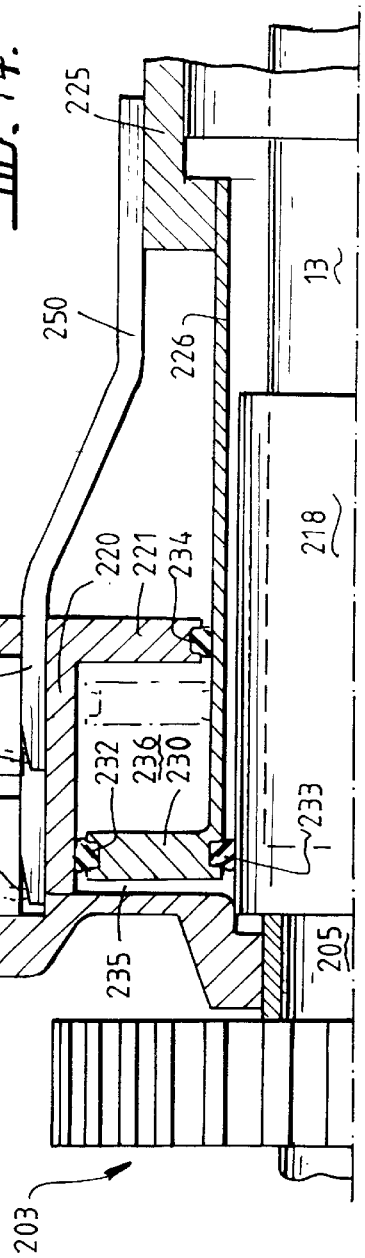

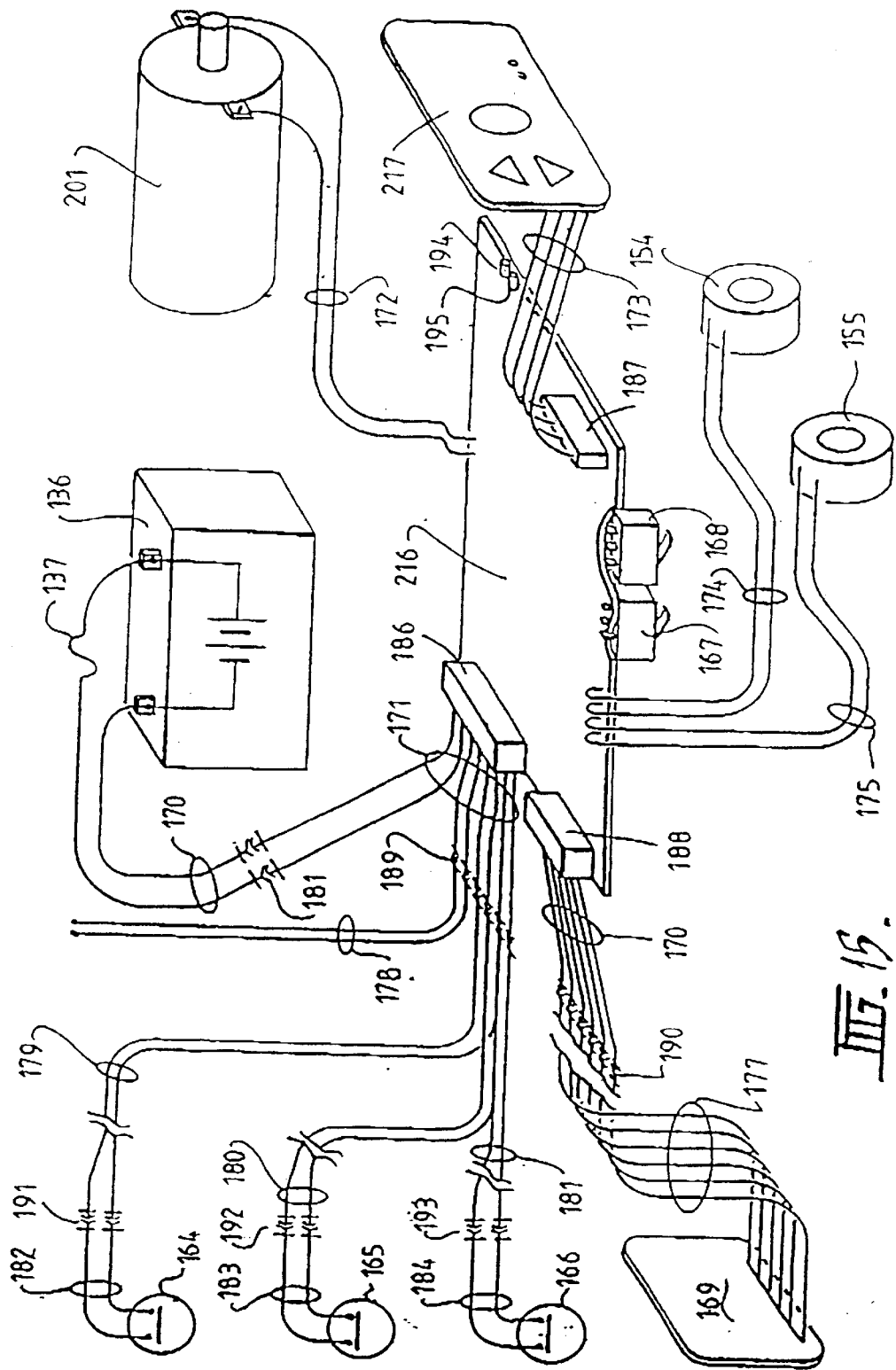

POWERED TRAILER JACKING SYSTEM

CROSS-REFERENCE TO RELATED APPLICATIONS

This application is a continuation-in-part of U.S. application Ser. No. 09/787,711, filed on Jun. 8, 2001, and now abandoned which is a 371 of PCT/AU00/00153 filed Mar. 6, 2000.

FIELD OF INVENTION

The present invention relates to landing gear (alternatively known as jacking legs) for articulated trailers.

BACKGROUND ART

Landing gear for articulated trailers allows the raising, lowering and support of the forward end of the trailer in the engagement and disengagement from the prime mover (alternatively known as the tractor or truck) and allows the trailer to be freestanding whilst not in transit. In most instances the trailer itself is decoupled from a prime mover and then re-coupled to either the same prime mover or an another depending on the logistics appropriate to the use.

A typical scenario is where a trailer is delivered to a loading dock for loading. The trailer will typically be loaded up to twenty tons in weight, and in some instances up to twenty five tons, on one trailer. The prime mover positions the trailer in the loading dock. The operator will de-latch the kingpin from the turntable (alternatively known as the fifth wheel) and disconnect the service lines. The operator will then manually lower the legs of the landing gear. First the landing gear will be lowered to ground level in the higher speed selection of the typically two-speed geared landing gear arrangement. Once engaged with the ground the operator generally has no option other than to change to the lower speed selection where the operator will enjoy the significant increase in mechanical advantage afforded by the higher gear ratio. The operator will then with significant effort raise the forward end on the trailer to clear the trailer kingpin from the turntable of the prime mover. Once the trailer king pin is clear of the prime mover turntable the prime mover can be driven clear of the trailer to leave the trailer freestanding. The prime mover is then typically utilized elsewhere in a more productive role than being idle whilst the trailer is loaded.

The trailer will then be loaded which may take a portion of an hour or it may take several days. Once the trailer is loaded a prime mover will then return to the trailer for the removal from the loading dock. In many instances the prime mover will not be the same unit. In such cases the turntable height may not be identical or in other instances due to the poor stability of the ground on which the landing gear rests the trailer may have sunk. In either of these instances the height of the trailer will need to be adjusted to mate with the prime mover. The operator has the onerous task of manually winding the trailer either up or down to the necessary height. Once the trailer is at the correct height for engagement with the prime mover the operator can then locate the prime mover under the trailer, mating the kingpin with the turntable.

To prepare the trailer for transport the legs are manually raised in low speed until they are once again clear of the ground. Having cleared the ground the weight of the loaded trailer is transferred from the landing gear to the prime mover this then allows the landing gear to be changed by the operator to high speed for the legs to be raised to their full height. Raising to full height is necessary to allow ground clearance for traveling both on the road system and in some instances off the road system. Most known landing gear utilizes a two-speed operation and typically the increase in mechanical advantage enjoyed in low speed is in the order of ten to one over the high speed. Even with the advantages afforded by the two-speed operation the time to couple a trailer with a prime mover will find 15 minutes as not atypical. This is particularly so when a trailer is loaded to its limits which generally requires the operator to rest due to the physical fatigue associated with the manual effort required.

There are several teachings of prior art documenting many variations of powered drives that can be added to existing landing gear jacking legs at either the time of installation of the leg or a subsequent time. U.S. Pat. No. 5,451,076 to Burkhead, U.S. Pat. No. 5,299,829 to Rivers, Jr, et al, U.S. Pat. No. 5,050,845 Aline, et al and U.S. Pat. No. 5,004,267 to Busby teach of a pneumatic motor to provide the necessary motive force to rotate the crank shaft (drive shaft) of the landing gear prior art. U.S. Pat. No. 4,466,637 to Nelson teaches of a drive motor such as an electric motor whilst we learn from U.S. Pat. No. 4,097,840 to Chappelle of an electric drive motor. It is noted that all of this prior art has existed for some time yet there is no significant commercialization of this art. The pneumatic teachings have not been accepted due their complexity and expensive nature of their pneumatic componentry. The prior art teachings of electrical motors is cumbersome, weighty and dated in technology. All the prior art tends to be overly complex and does not readily mount up to all commercial landing gear currently available and used within the trucking industry. Most of the prior art requires a strong dependence on the provision of power from the prime mover, that is, the prime mover is required to be coupled to the trailer for the prior art to function.

It is these problems that have brought about the present invention.

SUMMARY OF THE INVENTION

According to the present invention there is provided a demountable drive mechanism for the landing gear of a semi-trailer, the landing gear including legs that are extendable and retractable by rotation of a drive shaft through a gear mechanism, the drive shaft being axially displaceable to change the ratio of the gear mechanism, the drive mechanism comprising an electric motor having an output shaft adapted to be coupled to the drive shaft of the landing gear assembly, the electric motor being coupled to the landing gear through a torque arm so that the electric motor can impart torque to the drive shaft, means to axially displace the drive shaft to change the gear ratio, and means to control operation of the electric motor and axial displacement of the drive shaft.

According to a further aspect of the invention there is provided a demountable drive mechanism for the landing gear of a semi-trailer, the landing gear including legs that are extendable and retractable by rotation of a drive shaft through a gear mechanism, the drive shaft being axially displaceable to change the ratio of the gear mechanism, the drive mechanism comprising an electric motor having an output shaft adapted to be coupled to the drive shaft of the landing gear assembly, the electric motor being coupled to the landing gear through a torque arm so that the electric motor can impart torque to the drive shaft, the mechanism being axially displaceable to axially displace the drive shaft to change the gear ratio, and means to control operation of the electric motor.

BRIEF DESCRIPTION OF THE DRAWINGS

Embodiments of the present invention will now be described by way of example only with reference to the accompanying drawings in which:

FIG. 1 is a side elevational view of a truck and trailer;

FIG. 2 is a side elevational view of the trailer when detached from the truck;

FIG. 5a is a side elevational view of part of the landing gear of FIG. 4 in a first speed mode;

FIG. 5b is a side elevational view of the landing gear in a second speed mode;

FIG. 6 is an exploded perspective view of the landing gear;

FIG. 8 is a perspective view of a landing gear with demountable drive system in accordance with the second embodiment;

FIG. 9 is an exploded perspective view of the drive system gear of FIG. 8;

FIG. 10 is an end on elevation view of a gearbox of the landing gear shown in FIG. 9;

FIG. 11 is a cross sectional view taken along the lines 11—11 of FIG. 10;

FIG. 12 is a cross sectional view taken along the lines 12—12 of FIG. 10;

FIG. 13 is a cross sectional view taken along the lines 13—13 of FIG. 10;

FIG. 14 is a cross sectional view similar to FIG. 13 illustrating a limit switch operation;

FIG. 15 is a schematic illustration of the wiring associated with the circuit of the second embodiment;

DETAILED DESCRIPTION OF THE PREFERRED EMBODIMENTS

The use of landing gear for trailers according to the present invention is illustrated in FIGS. 1 and 2. In FIG. 1 the landing gear 100 is illustrated in the position it occupies when the truck T and trailer 1 are in motion. In FIG. 2, the landing gear 100 is illustrated in the position it occupies to support the trailer 1 when the prime mover (truck T) has been decoupled from the trailer 1.

Figure 3A:
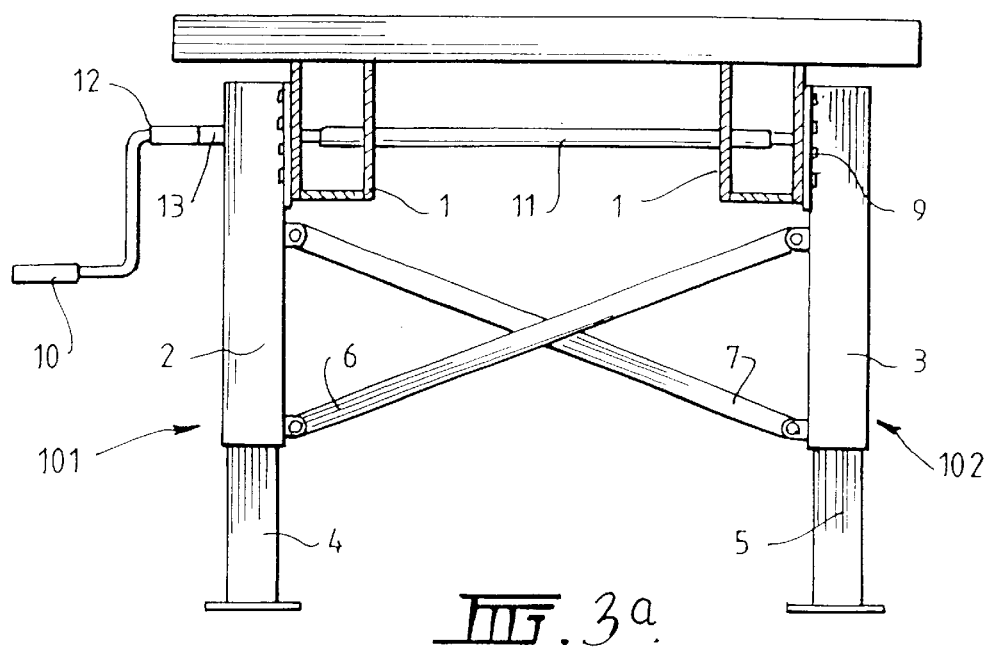
FIGS. 3a and 3b are elevational views of a common form of trailers landing gear used with the trailer of FIG. 2.
Figure 3B:
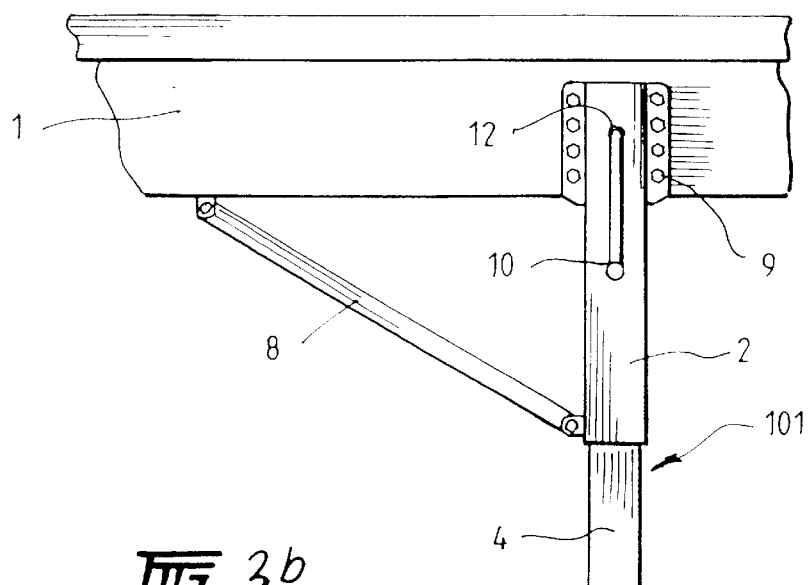

As shown in FIGS. 3a and 3b, a conventional well known form of landing gear includes a pair of telescoping legs 101 and 102. Each leg includes an upper portion 2, 3 and a lower portion 4, 5 which telescopes into the upper portion 2 or 4 respectively. Each upper portion 2 and 3 is secured one to a side of the trailer chassis 1 with multiple bolts 9. The upper portions 2 and 3 of the telescoping legs are braced to each other with cross-bracing members 6 and 7. Each upper portion 2 and 3 of the telescoping legs 101 and 102 respectively is braced to the chassis by diagonal bracing members 8.

Figure 3C:
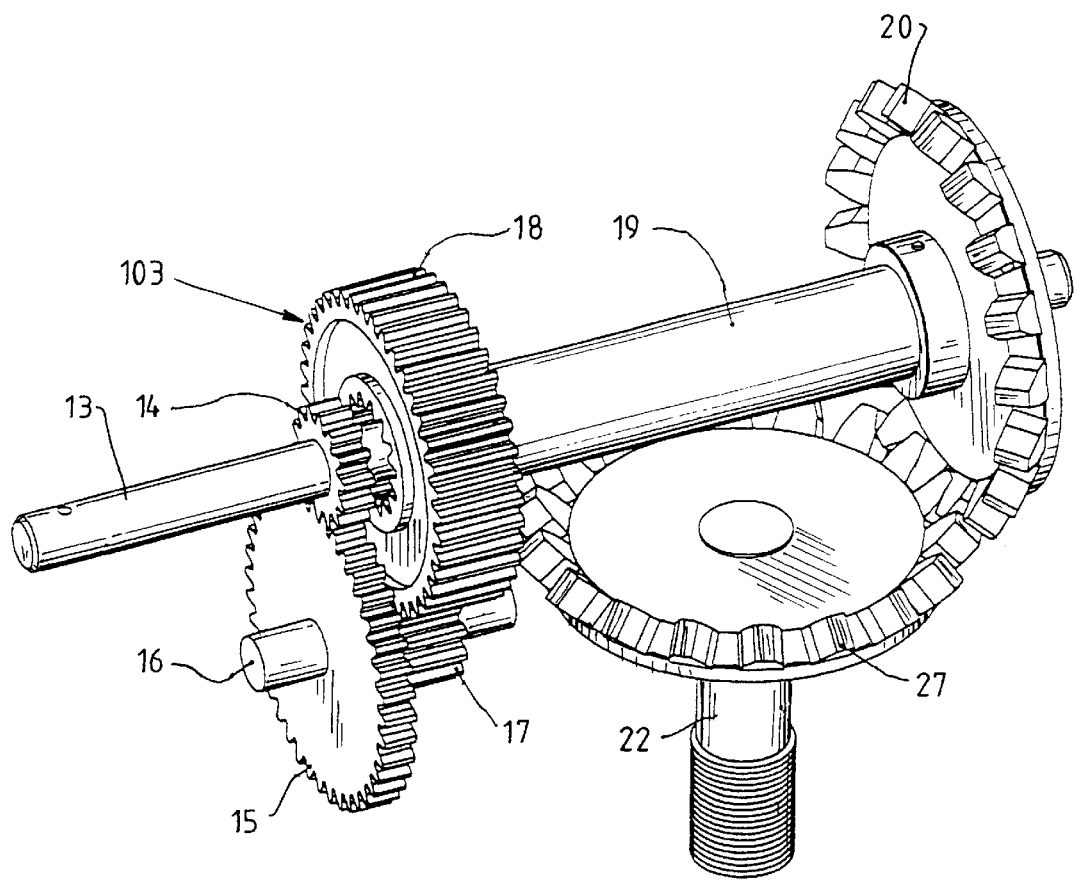
FIG. 3c is a perspective view of a gear change mechanism of the landing gear of FIGS. 3a and 3b.
Figure 4:
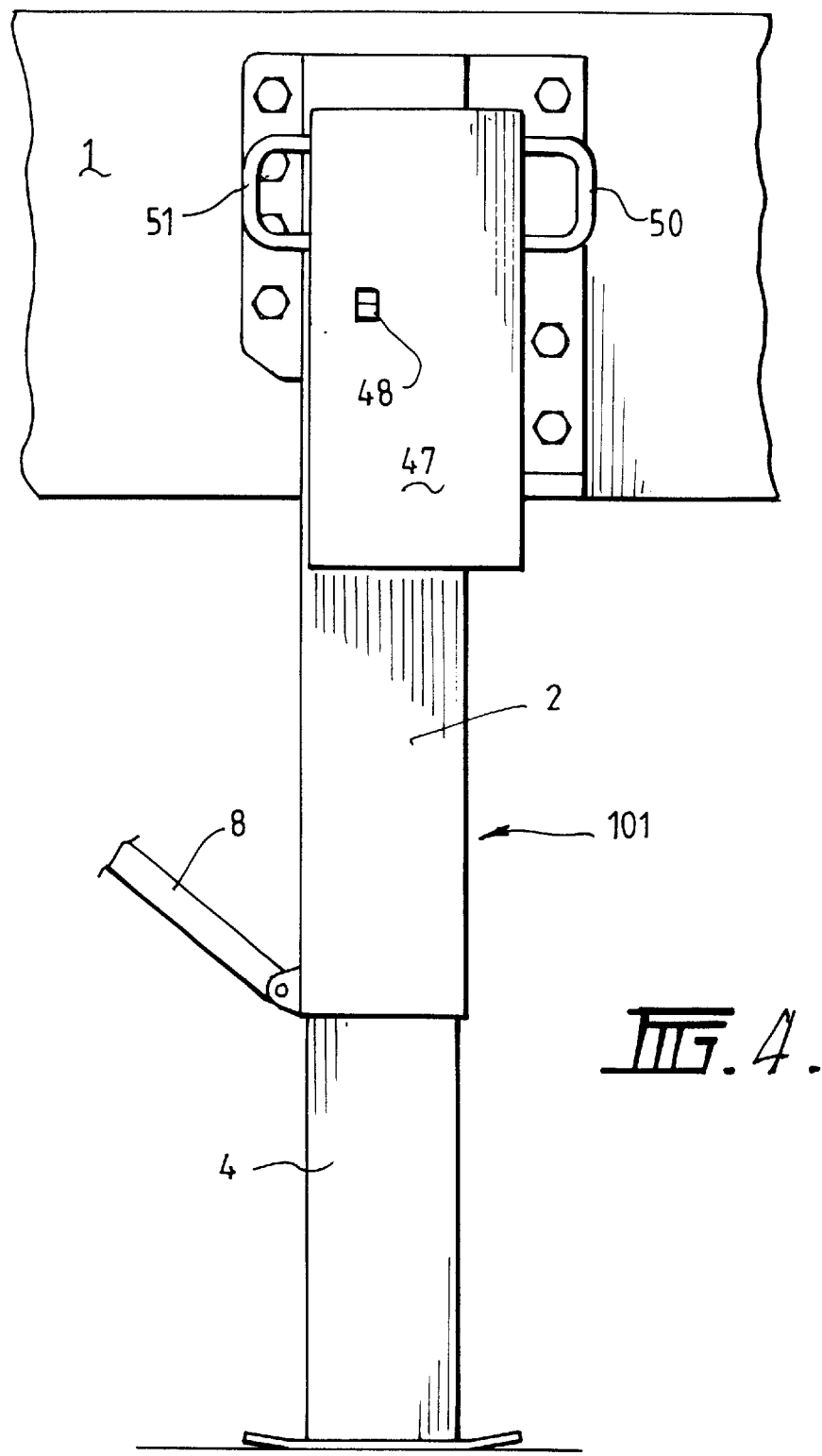
FIG. 4 is a side elevational view of landing gear in accordance with an embodiment of the invention.

The driver's side leg 101 of the landing gear houses a two-speed reduction gear head illustrated generally as 103 as illustrated in FIGS. 3c. In the conventional mode of operation of the landing gear, the legs 101 and 102 are operated by a manual crank handle 10 which is removably attachable to the drive shaft 13 via a bolt. The leg 101 which houses the two-speed gear head 103 could also be mounted on the non driver's side.

FIG. 3c illustrates the operation of the two-speed reduction gear 103. It is preferred that the gear head 103 is housed within the upper telescoping leg 2. In an alternative form, the gear head 103 is housed external to the upper leg section 2 and is arranged such that the gear reduction in one mode is not directly coupled. For clarity the gear head housing is not shown in FIG. 3c. The purpose of the mechanics of the gear train is to afford the significant mechanical advantage required when a human operator is manually raising or lowering a loaded trailer. The two-speed feature of the drive head of the landing gear is to allow a rapid motion of the telescoping legs 4 and 5 in either the up or down mode whilst they are not loaded with the trailer and/or its load.

The motive power for raising or lowering the telescoping legs 4 and 5 is usually from a human source or from a powered source. In the arrangement as shown in FIG. 3a, the landing gear is powered by a human operator. The rotary motion (winding) of the crank handle 10 is imparted to the drive shaft 13 through the coupling bolt 12. When the drive shaft 13 is in the inboard position not shown in FIG. 3c, the gear head is in the high speed mode where the least mechanical advantage is provided. The power is transmitted from drive shaft 13 to the spur gear 14 which is solidly attached to the drive shaft 13. In the inboard position the spur gear 14 is nested internally within the spur gear 18 and provides a direct drive to spur gear 18 which is solidly mounted to the shaft 19. The bevel gear 20 is also solidly mounted to the shaft 19. Drive is therefore from spur gear 18 through shaft 19 to bevel gear 20. Bevel gear 20 is permanently engaged with the mating bevel gear 21 which is affixed to the screw shaft 22. Screw shaft 22 provides the vertical motion to the telescoping legs 4 and 5 (not shown) via a mating nut (not shown) which is attached to the telescoping legs 4 and 5.

When transmission of power in low speed with the higher mechanical advantage is required the drive shaft 13 is in the outboard position shown in FIG. 3c and clears the spur gear 18 and engages with the spur gear 15. Spur gear 15 is fixed to the lay shaft 16 which has gear 17 fixed to it. The drive is transmitted from drive shaft 13 to spur gear 14 to spur gear 15 through lay shaft 16 to spur gear 17 to spur gear 18. The transmission of power from spur gear 18 to the screw shaft 22 is identical as in high speed as described above.

This invention relates to the use of an electrical motor and associated control mechanism to provide drive to the output shaft to operate the landing gear. The control mechanism also provides means to effect the speed change mechanism by displacing the output shaft axially. The assembly has been specifically designed to be retrofitted to the most common forms of landing gear. Thus, the assembly is adapted to drive the output shaft both in terms of rotation and axial displacement for speed change. The landing gear assembly and speed change mechanism described above is the commonly used system in the trucking industry.

According to one configuration of the apparatus according to the present invention shown in FIGS. 4 to 7, the manual crank handle 10 and is not used and motive power is provided by an electronically controlled geared electric motor. Preferably electrical energy is the power source and it is derived and converted from the prime mover's own internal combustion engine which is ultimately provided by the fuel that energizes that said engine. In alternative preferred embodiments, electrical energy is externally provided from other than the prime mover. A preferred power source for primarily stationary applications is the local civilian electricity grid. This power source is converted to the mechanical energy required to raise and lower the trailer complete with load as necessary. For the purpose of describing the invention electrical power is provided by the prime mover's own reticulated low voltage electrical system.

Energy is stored within the trailer in preferably two batteries 36 and 37. Two batteries are used to provide the necessary twenty-four volt operating electric potential that is used to power the electric motor 23. The batteries 36 and 37 are deep cycle heavy duty batteries that are capable of withstanding the duties appropriate to this rigorous invention. From FIG. 7 it can be seen that the batteries 36 and 37 are electrically in series and are coupled together with conductor 71 being connected to the negative and positive terminals of batteries 36 and 37 respectively. The positive terminal of battery 36 is connected to the electronic controller 24 with conductor 72 via the single pin connector 81. The conductors 70, 71 and 72 are fixed to the terminals of the batteries 36 and 37 with bolts 38. The negative polarity of the battery 37 is coupled to ground, being the trailer chassis, via conductor 70. These batteries 36 and 37 are mounted within a battery case 40 which is secured to the landing gear. The battery case is enclosed with a sliding lid 43 which is capable of being secured through the inclusion of a lug 44 to prevent theft or tampering. The batteries 36 and 37 are snugly located by the use of a pliant membrane 39 that insulates the batteries 36 and 37 from the battery case 40. This membrane 39 could typically be an expanded urethane sheet material. The battery case is secured to the leg of the landing gear with multiple self taping screws 42 which are accessed when the batteries 36 and 37 are not in place via the clearance apertures 41. Alternative methods, locations and fixing for the batteries 36 and 37 may be appropriate for certain applications and as such are included in this invention. To minimize the distances of the high current electrical conductor 72 the batteries 36 and 37 are mounted adjacent the demountable geared motor assembly 104. The arrangement of batteries 36 and 37, battery case 40, sliding lid 43, lug 44, pliant membranes 39 and self taping screws 42 form the battery assembly 105 as depicted in FIGS. 5a and 5b.

The electronic controller 24 is mounted adjacent the electric motor 23 with multiple bolts 34. The electronic controller 24 chassis is earthed to the trailer chassis through conductor 73. The electric motor 23 is connected to the electronic controller 24 through conductors 79 and 80 via the two pin connector 82. The raise/lower switch 48 is directly connected to the electronic controller 24 through conductors 76 and 77. The common terminal of the raise/lower switch 48 is connected to earth via the conductor 78. The positive polarity of the trailer derived power supply (not illustrated) to the electronic controller 24 is feed through conductor 75 via the two pin connector 83 with the negative polarity being connected to ground through conductor 74.

Figure 7:
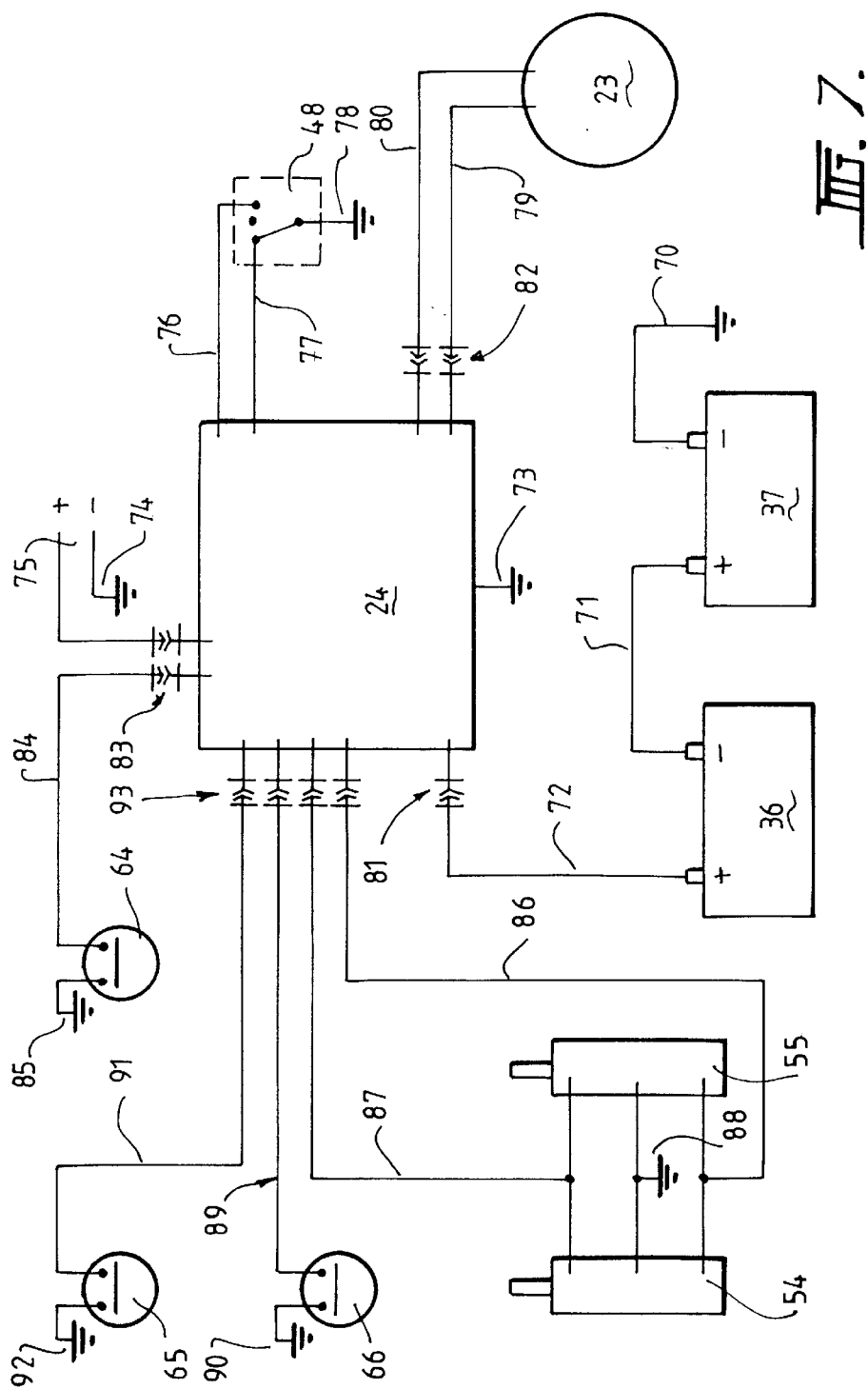
FIG. 7 is a diagram of the circuit associated with the landing gear.

In the embodiment as illustrated in FIG. 7 the brake air pressure interlock switch 64 is connected to the electronic controller 24 through conductor 84 via the two pin connector 83. The brake air pressure interlock switch 64 common terminal is connected to ground through conductor 85.

As illustrated in FIG. 7 two bi-directional electric solenoids 54 and 55 are connected to the electronic controller 24 through conductors 86 and 87 with the third necessary conductor from the electric bi-directional solenoids 54 and 55 connected to earth through conductor 88. The turntable clear interlock switch 65 is connected to the electronic controller 24 through conductor 91 with the common earthed through conductor 92. The legs up interlock switch 66 is connected to the electronic controller 24 through conductor 89 with the common earthed through conductor 90. The two bi-directional solenoids 54 and 55, the turntable clear interlock switch 65 and the legs up interlock switch 66 are all connected to the electronic controller 24 via the 4 pin connector 93.

As one of the objectives of this invention is to be universally mounted, either a twelve volt or a twenty four volt trailer operating voltage can be received by the electronic controller 24. The electronic controller 24 will typically accept a voltage input range from 10 volts to 30 volts DC which is electronically converted to the necessary battery charging voltage to ensure the batteries are maintained at their peak operating condition. Charging is achieved at the operators discretion by providing the trailers reticulated voltage to the input connector 83 of the invention through conductors 75, 74 and 73. The electronic controller 24 includes circuitry to prevent failure of any of the electronic components should the batteries 36 and 37 or supply voltage (not illustrated) be inadvertently connected in the reverse polarity.

The electronic controller 24 receives indication from the raise/lower switch 48 as to the desired operation. This is achieved by effectively connecting conductors 76 or 77 to earth via the raise/lower switch 48 and conductor 78 for raise and lower modes respectively. The electronic controller 24 uses the indication as above-mentioned from raise/lower switch 48 to undertake the necessary high current voltage switching to operate the invention from the off to either the raise or lower modes. In effect the voltage as fed through the conductors 79 and 80 via connector 82 to the electric motor 23 is the battery voltage (in series) for the raise mode with the polarity being reversed across the conductors 79 and 80 and the electric motor 23 for the lower mode. Connector 82 is included to ensure that the electric motor 23 can be readily disconnected in the event of failure of the electric motor 23.

In this embodiment the electronic controller 24 includes an electronic circuit to ensure the electric motor 23 current is limited to a set value. If the load is such that the electric motor 23 attempts to use excessive current the electronic controller will de-energize the voltage being feed to conductors 79 and 80. The supply will not be re-energized until both a short time delay has passed and the raise/lower switch 48 has been cycled through the off position. Such over current conditions will arise where the end of the stroke of the landing gear legs 4 and 5 has been reached and the electric motor 23 is left operating. Preferably when the landing gear legs are being lowered in high speed the invention allows the operator to undertake other routine duties as the overload protection component of the invention will stop the motor once the telescoping legs 4 and 5 have engaged the ground. The electronic controller 24 is configured so that the change from high speed to low speed will take place automatically as described elsewhere in these teachings.

From FIG. 7 the raise and lower modes can be understood. The raise/lower switch 48 when in the raise mode effectively connects the conductor 77 to ground through raise/lower switch 48 and conductor 78. Whereas in the lower mode the conductor 76 is conducted to ground through raise/lower switch 48 and conductor 78. The raise/lower switch 48 as described herein has three positions. In the raise position the raise mode is energized, in the lower position the lower mode is energized and in the central off position the electric motor 23 is not activated. The raise/lower switch is a spring return centralizing type switch.

FIG. 7 illustrates a trailer brake air pressure interlock switch 64. This switch is closed when the brake air pressure drops to a point where the trailer brakes (not illustrated) are positively engaged. The inclusion of this element of the circuit design is optional and at the discretion of the operator as some applications would be hindered by the inclusion of such an interlock.

In an alternative embodiment (not illustrated) the conductor 84 is connected to ground. If the brake air pressure interlock switch 64 is not installed the conductor 84 is required to be connected to ground, as such the electronic controller 24 will interpret the imaginary switch as being on.

In this embodiment sensors and actuators are included along with electronic control circuitry to allow the gear change in the trailer landing gear to be undertaken automatically. The turntable clear interlock switch 65 and the legs up interlock switch 66 are used to sense the completed lower and raise automatic cycles respectively of this embodiment of this invention. As described elsewhere in these teachings the bi-directional electric solenoids 54 and 55 are used to activate the change in gears within the trailer landing gear gear head 103.

The electric circuit as herein described is one of several possible solutions to provide an operating system in a twelve or twenty four volt environment. Other options and variations, such as relays, may be equally suitable and inclusive in this invention.

The demountable geared electric motor assembly 104 comprises a drive motor that is preferably a direct current electric motor. The electric motor 23 is close coupled to a worm reduction gearbox 31. However it is understood that other reduction mechanisms could be deployed. Planetary gear trains, spur gear reduction and chain drives and combinations thereof are all considered suitable alternatives to the worm reduction gearbox described herein. The output male shaft 27 of the motor is positively coupled via a key 28 to the female input shaft of the gearbox 31. The electric motor 23 is secured to the mating gearbox flange 29 with multiple bolts 30. The gearbox 31 includes a hollow output shaft which is sized to be a slide fit on the landing gear drive shaft 13. This size may vary from one commercial landing gear to the next. The demountable geared assembly is mounted on and supported by the landing gear drive shaft 13 and includes a collar 32 which is an interference fit in the gearbox 31 hollow output shaft. The existing landing gear drive shaft 13 has a new hole 35 added to accept the pin 33 which passes through both the drive shaft 13 and the collar 32. This pin 33 is a press fit within the collar 32 and the hole 35. A torque arm 45 is supported from the upper leg 2 via bolts 46. This torque arm 45 is a slide fit in the pliable bushing 26 which in turn is fitted within a fork flange 25 protruding from the base of the electric motor 23 housing. The torque arm 45 is preferably made of spring steel. The entire demountable geared electric motor assembly 104 includes and is enclosed within a cover 47. The cover is secured to the gearbox 31 housing with multiple bolts 53. Spacers 52 are used as appropriate between the cover 47 and the gearbox housing. The electronic controller 24 is housed adjacent the electric motor 23 and is supported from the cover 47 with bolts 63. Electrical conductors as elsewhere described extend from the electronic controller 24 to the battery assembly 105, the electric motor 23, the trailer power supply (not illustrated) and other field devices all as illustrated in the circuit diagram of FIG. 7.

In this embodiment the demountable geared motor assembly 104 includes two bi-directional electric solenoids 54 and 55. These are located diametrically opposed about the drive shaft 13 and the bodies of the electric solenoids 54 and 55 are secured to the cover 47 with multiple screws 56. The electric solenoid shafts 57 and 58 are connected to the landing gear upper leg 2. The landing gear upper leg 2 has a solenoid coupling bracket 61 which is secured to the landing gear upper leg 2 with screws 62. The electric solenoid shafts 57 and 58 are connected to the solenoid coupling bracket 61 via a pins 59 and 60. The electrical conductors as illustrated in FIG. 7 connect the electric solenoids 54 and 55 to the electronic controller 24.

The preferred electric motor 23 has a high energy density ratio and is ideal in this application. It is compact and relatively light in weight which is a criterion in most freight applications. Drive from the electric motor 23 is transmitted to the gearbox 31 through the key 28 which in turn is transmitted to the landing gear drive shaft 13 via the collar 32 and pin 33. In addition to transmitting the drive torque the pin 33 provides the lateral fixing of the demountable geared electric motor assembly 104 to the landing gear. The torque applied to the landing gear drive shaft 13 by the electric motor 23 is resisted by the torque arm 45. The torque arm is specifically so placed to react to the torque applied in operation of the demountable geared electric motor assembly 104 to the landing gear drive shaft 13. The material used to manufacture the torque arm 45 provides a degree of flexibility. This flexibility allows any shock loading to the drive assembly to be minimized. When the demountable geared electric motor assembly 104 is laterally moved as illustrated in FIGS. 5*a* and 5*b* the torque affords a minimal rotational allowance to allow the meshing of the gears as the high speed or low speed is engaged. To allow for the lateral movement when the gear change is undertaken the torque arm 45 is a slide fit in the pliable bushing 26.

The cover 47 provides the necessary minimal guarding required to ensure operator safety as well as providing a base for the mounting of the bi-directional electric solenoids 54 and 55 and the electronic controller 24. The cover 47 accommodates the mounting of the raise/lower switch 48.

In the embodiment of FIGS. 5*a* and 5*b* the bi-directional electric solenoids 54 and 55 are used to move the entire demountable geared electric motor assembly 104 inclusive of the drive shaft 13 laterally, that is, inboard and outboard. This lateral movement of the whole drive system reflects the change from high speed to low speed or vice versa within the geared head of the existing landing gear. The force applied by the solenoids in conjunction with the rotational flexibility provided by the torque arm are sufficient to ensure the speed change is positive and complete. FIG. 7 illustrates bi-directional electric solenoids 54 and 55 of this embodiment.

According to another embodiment of the invention (not illustrated) the gear change from high speed to low speed and back again within the landing gear is carried out independent of the drive system. The geared electric drive motor assembly position is fixed and the landing gear drive shaft 13 is acted on by a mechanism that allows the change from high speed to low speed independent of the geared electric motor drive assembly. In this embodiment the coupling between the landing gear drive shaft 13 and the demountable geared electric motor drive assembly 104 is a keyed slide fit of the landing gear drive shaft 13 within the hollow shaft of the reduction gearbox 31.

A typical scenario for an automatic down cycle is initiated, when the system is not already operating, by the operator flicking the raise/lower switch 48 to the lower position for approximately one second. The electronic controller 24 then activates the bi-directional solenoids 54 and 55 to ensure the gear head 103 is in the high speed mode. The lower legs 4 and 5 are then lowered by the electric motor 23 as elsewhere described. When the landing gear lower legs 4 and 5 become engaged with the ground the electric motor 23 current eventually reaches its defined upper current limit and the electric motor 23 is stopped by the electronic controller 24. It should be noted at this point that in some circumstances the trailer and load may be so insignificant that the electric motor 23 current upper limit is not reached and the landing gear lower legs 4 and 5 can continue to be lowered in the high speed mode. The bi-directional solenoids 54 and 55 are activated to change the gearing to the higher ratio where the improved mechanical advantage is enjoyed. Upon this gear change being effected the electric motor 23 is again energized to continue lowering the landing gear. The automatic lower cycle is concluded on reaching one of three conditions:

The first condition being the electric motor 23 current has again reached the defined upper limit.

The second condition being that the turntable clear interlock switch has been activated.

The third condition is that the raise/lower switch 48 has been flicked to the raise position for approximately one second.

The automatic raise mode of this embodiment is activated, when the system is not already operating, and the raise/lower switch 48 is flicked to the raise position for approximately one second. The electronic controller 24 then activates the bi-directional solenoids 54 and 55 to ensure the gear head 103 is in the low speed mode. The lower legs 4 and 5 are then raised by the electric motor 23. When the turntable clear interlock switch is deactivated the electronic controller 24 stops the electric motor 23 after a short predefined period of time. The bi-directional solenoids 54 and 55 are activated to change the gearing to the lower ratio where the increased operation speed is enjoyed. Upon this gear change being affected the electric motor 23 is again energized to continue raising the landing gear. The automatic raise cycle is concluded on reaching one of three conditions:

The first condition being the electric motor 23 current has again reached the defined upper limit.

The second condition being that the legs up interlock switch 66 has been activated.

The third condition is that the raise/lower switch 48 has been flicked to the lower position for approximately one second.

In this embodiment of automatic gear changing there will be times when the landing gear lower leg 4 and 5 extension needs to be adjusted. This is achieved by holding the raise/lower switch 48 in either the raise or lower position for a period greater that two seconds. The electronic controller 24 will recognize this holding of the raise/lower switch 48 and not continue in an automatic mode but only raise or lower the legs for the period that the raise/lower switch 48 is held in either the raise or lower position respectively. Manual gear change can still be undertaken and is consistent with the non-automatic gear change embodiment in that the gear change is effected by the operator manually acting on the demountable geared motor assembly 104.

According to yet another embodiment (not illustrated), the gear change is manually operated.

In this embodiment the gear change is manually undertaken by the operator acting on the demountable geared motor assembly 104 which includes operator handles 50 and 51. The operator either pushes or pulls the whole demountable geared motor assembly 104 inboard or outboard thereby laterally shifting the drive shaft 13 and effecting the gear change in the gear head 103 of the landing gear.

A typical scenario of the operation of the system in a non-automatic mode is described as follows. The operator having positioned the trailer in the area ready for decoupling from the prime mover will, after having secured the brakes on the trailer, ensure the gear head is in the high speed disposition. In this position the raise/lower switch 48 will be activated to the lower position and the inner telescoping legs 4 and 5 of the landing gear will quickly lower to the ground. The operator has the option to wait at the legs until this occurs or he may elect to undertake a few other duties that are part of his decoupling routine. When the legs make contact with the ground if the operator does not return the raise/lower switch 48 to the off position the electronic motor controller 24 will prevent the drive from over loading and switch itself off. The raise/lower switch will then need to be returned to the central off position. After engaging the ground the operator will then make the change to low speed by grasping the handles 50 and 51 and undertaking the minimal lateral movement to engage low speed. In low speed a significant mechanical advantage is provided by the landing gear gear head 103 and the operator can now re-energize the system in the lower mode by activating the lower mode of the raise/lower switch 48. Once the trailer has been raised so that the trailer kingpin is clear of the prime mover turntable the raise/lower switch is returned to the off position. When the operator has undertaken all other service disconnection's between the prime mover and the trailer the prime mover can be driven clear and the trailer left as a freestanding unit.

When the freestanding trailer is required to re-coupled to a prime mover the operator will assess if the trailer is at the appropriate height. If not then the operator will ensure the low speed is engaged within the gear head of the landing gear. The height of the trailer can be adjusted by operating the raise/lower switch 48 as appropriate. Once the trailer is at the correct height the prime mover can be located under the trailer. The trailer landing gear legs 4 and 5 can now be raised to be clear of the ground by operating the raise/lower switch 48. Once clear of the ground the operator can engage the high speed mode within the landing gear and continue to raise the legs until they are in the fully retracted position. Once the legs are fully retracted in the raised position the raise/lower switch 48 is returned to the central off position. If the operator does not turn off the raise mode before the landing gear has reached its uppermost position the electronic controller 24 will take over and de-energize the electric motor 23. After completing all other couplings between the trailer and the prime mover the trailer is then ready to be removed from its freestanding position.

As in all mechanical and electrical mechanisms failure can occur and the system caters for this in that the demountable geared electric motor assembly 104 is readily removed. The procedure for removal of the drive assembly is as follows: The electrical connectors 81 and 83 are disconnected, in an alternative embodiment connector 93 it is also disconnected. The pin 33 is removed and the whole drive assembly can be demounted by sliding the assembly outboard and off both the landing gear drive shaft 13 and the torque arm 45. Once this is carried out the original manual crank handle 10 is remounted to the landing gear drive shaft 13 with a bolt nut (not illustrated). The operator can then operate the landing gear in the traditional manner. The manual crank handle 10 is separately stored on the trailer in the advent that a failure was forthcoming.

In the embodiment shown in FIGS. 8 to 15, a more compact system 200 is used to drive the landing gear. The system is similar to the embodiments described above by utilizing an electric motor 201 that is supported in a housing 202 that in turn supports a gearbox 203 positioned between the output shaft 204 of the electric motor and a drive shaft 205 which is in turn coupled to the drive shaft 13 of the landing gear. As shown in FIG. 8 the motor 201 is positioned with its axis parallel to the drive shaft 205 and the gearbox 203 is located at the outboard end 207 of the assembly. The lower rear face of the housing 202 has a projecting spigot (not shown) that is a sliding fit within a torque arm in the form of a steel rod 209 that is secured to the leg of the landing gear via an angled bracket 206. The torque arm 209 facilitates transfer of torque from the electric motor 201 to rotate the shaft 13 of the landing gear. This embodiment also includes an automatic gear change facility, except in this case the gear change facility is pneumatically driven by the air pressure that emanates from the trailer's air braking system.

As shown in FIGS. 9 and 11, the housing 202 is split into two parts, namely a front cover 211 that can be bolted to a rear part 212 of the casing that houses the gearbox 203. The upper part of the housing defines a sub-compartment 215 which is sealed from the remainder of the housing and which contains a circuit board 216. A main operator panel 217 is attached to the exterior surface of the sub-compartment 215. The output shaft 205 of the gearbox has an enlarged hollow spigot 218 which extends co-axially into a cylindrical drum 220 that is sealed by an end plate 221 to define an air chamber.

The input shaft 13 of the landing gear locates coaxially in a fixed collar 225 that is mounted to the leg of the landing gear. The collar 225 steps down to an elongate sleeve. The sleeve 226 has an axially hollow projection 227 that terminates in an annular face plate 230. As shown in FIGS. 11 and 12, the input shaft 13 locates within the spigot 218 of the output shaft 205 of the gearbox 203. As shown in FIG. 12, the spigot 218 and input shaft 13 are secured together by a transverse pin 231 that ensures transfer of axial rotation as well as axial displacement to the input shaft of the landing gear.

The arrangement is such that the housing 202 together with the electric motor 201, gearbox 203 and drum 220 can move axially relative to the collar 225, sleeve 226, limit switch actuating arm and face plate 230 to displace the input shaft 13 to effect a speed change. The face plate 230 contacts the interior of the drum 220 and exterior of the spigot 218 via 'O' ring seals 232, 233 to divide the air chamber into two sub-chambers 235, 236 on either side of the face plate 230. An 'O' ring seal 234 also acts between the end plate 221 and the sleeve 226 allows relative movement whilst maintaining air pressure within the sub-chamber 236.

The compartment of the housing 202 that houses the gearbox 203 can be pressurized from the trailer's air brakes to act as an air pressure reservoir that can contain enough pressurized air to facilitate operation of the speed change mechanism. The air pressure within the gearbox housing 202 is transmitted to the sub-chambers 235, 236 via solenoid controlled valves 240, 241 shown in FIGS. 12 and 13. The left hand valve 240 is shown in FIG. 12 and comprises a valve member 242 urged outwardly by a spring 243. The solenoid 154 drives the valve member 242 inwardly against the spring 243 to allow air to flow into the sub-chamber 235 on the left hand side of the face plate 230. In the neutral position, the spring 243 pushes the valve member 242 to the left as shown in FIG. 12 which allows the sub-chamber 235 to vent to atmosphere through a small bleed aperture 248 shown in FIG. 12. The sub-chamber 236 on the other side of the face plate can also bleed to atmosphere via bleed aperture 249 and the other solenoid controlled valve 241 shown in FIG. 13.

By actuation of either valve through the solenoids 154, 155 the sub-chambers 235, 236 are pressurized to cause the housing 202 to be displaced relative to the fixed sleeve 226 and face plate 230. This displacement of 22 to 25 mm is all that is required to effect the speed change. The sub-chambers can be vented to atmosphere in the neutral positions of the valves to ensure that there is a simple opportunity for manual override should there be a loss of air pressure. The gearbox enclosure is an elegant means of providing a reserve of air pressure so that the speed change mechanism can operate a number of times without the need for further pressurized air from the prime mover.

In this embodiment the pneumatic actuation of the speed change is at low pressure, approximately 15 psi. The compressed air is supplied to the housing 202 via flexible piping (not shown) from the existing compressed air system that is used to actuate the trailer's braking system. The air pressure is regulated to the desired low pressure by an inline pressure regulator. A check valve (not shown) is incorporated in the supply line to ensure against inadvertent loss of air pressure from the housing. Whilst the housing of the gearbox 203 is used as a low pressure air reservoir, it is understood that a safety over pressure relief valve (not shown) is fitted to the housing to ensure against over inadvertent increase of air pressure within the housing that might blow the seals.

The narrow bleed apertures 248, 249 that cause the sub-chambers 235, 236 to vent to atmosphere in the neutral position of the valves are specifically designed to slow down the release of air to act as a device that cushions the travel of the face plate 230 in either direction.

It is understood that instead of using the gearbox housing 202 as an air pressure reservoir, a separate tank or cylinder could be utilized in line with the air supply. The pneumatic system provides a smooth and positive speed change facility which can be finely tuned by controlling the air pressures to ensure efficient operation. The assembly has been specifically designed to be reduced to the competitive cost for a minimum weight and complexity.

As shown in FIG. 14, a limit switch actuating arm 250 of offset section is solidly mounted on the collar 225 to extend towards the exterior of the drum 220. A pair of limit switches 167 and 168 are mounted on the circuit board 216 to be activated by contact with the end 251 of the arm 250 as the housing moves relative to the collar 225. As the axial movement of the system 200 reflecting a gear change is undertaken the actuating arm acts on the miniature limit switches 167 and 168. Miniature limit switches 167 and 168 are electrically connected to the circuit board 216 as described later in the specification.

As shown in FIG. 15, energy is stored within the trailer in preferably at least one battery 136. A battery 136 is used to provide the necessary twelve volt operating electric potential that is used to power the electric motor 201. From FIG. 15 it can be seen that the positive and negative terminals of battery 136 are connected to the circuit board 216 with dual conductor 170 and a multiple core conductor 171 via a dual pin connector 181 and connector 186. The connector 186 is directly mounted on the circuit board 216. The dual conductor 170 is fixed to the terminals of the battery 136 with bolts (not shown). The conductor from the positive polarity of the battery 136 includes an in-line thermally acting fuse 137. The battery 136 is mounted within a battery cradle (not shown) which is secured to the landing gear 2.

The circuit board 216 is mounted within the housing sub-compartment 215 of the system 200 and is located via a snug fit within two parallel slots on either internal side of the housing sub-compartment 215. The electric motor 201 is connected to the circuit board 216 through dual conductor 172 which is directly affixed to the circuit board 216. The main operator panel 217 is electrically coupled to the circuit board 216 with the multiple core conductor 173 via the circuit board 216 mounted connector 187. The positive and negative polarity of the trailer derived power supply (not illustrated) is coupled to the circuit board 216 through the dual conductor 178 via the multiple pin connector 189, the multiple core conductor 171 and the circuit board 216 mounted connector 186.

In the embodiment as illustrated in FIG. 15 the brake air pressure interlock switch 164 is connected to the circuit board 216 through conductors 182, 179 and 171 via the connectors 191,189 and 186. Two electric solenoids 154 and 155 are connected to the circuit board 216 through conductors 174 and 175 which are directly affixed to the circuit board 216. The turntable clear interlock switch 165 is connected to the circuit board 216 through conductors 183, 180 and 171 connectors 192, 189 and 186. The legs up interlock switch 166 is connected to the circuit board 216 through conductors 184,181 and 171 with connectors 193, 189 and 186. The alternate operator panel 169 acts identically to the main operator panel 217 and is electrically connected in parallel with the main operator panel 217. The alternate operator panel 169 is connected to the circuit board 216 with the multiple conductors 177 and 176 and multiple connectors 190 and 188. Two industry standard miniature limit switches 167 an 168 are mounted directly to the circuit board 216. Two light emitting diodes 194 and 195 are mounted directly to the circuit board 216. Both diodes emit light through apertures in the main operating panel 217. Multiple pin connectors 186 and 188 are mounted electrically directly to the circuit board 216 and physically to apertures in the rear of the housing sub-compartment 215. Connectors 186 and 188 are included to ensure that the system 200 can be readily disconnected in the event of failure of any of the components.

Multiple conductors 171 and 176 and their associated connectors and downstream conductors effectively form electrical looms and are used to connect to all electrical devices remote from the system 200 housing and the enclosed circuit board 216. The connectors 186 and 188 are environmentally sealed at the interface with the housing sub-compartment 215.

The control circuitry is made up of various standard industrial electrical and electronic components mounted directly on the circuit board 216. As one of the objectives of this system is to be universally mounted, either a twelve volt or a twenty four volt trailer operating voltage can be received by the control circuitry. The control circuitry will typically accept a voltage input range from 10 volts to 30 volts DC which is electronically converted to the necessary battery charging voltage to ensure the battery 136 is maintained at its peak operating condition. This is achieved through the inclusion of an industry standard isolated flyback power converter which acts as a trickle charging circuit allowing the battery to be charged. Charging is achieved at the operator's discretion by providing the trailer's reticulated voltage to the input dual conductor 178. Standard industrial relays which are mounted on the circuit board 216 are included to allow for the high current forward and reverse switching of the electric motor 201. The electric motor 201 current is monitored via the amplified voltage across a circuit board 216 mounted resistor and feed to the microprocessor. Circuitry is included to prevent failure of any of the electronic components should the battery 136 or supply voltage (not illustrated) be inadvertently connected in the reverse polarity. The microprocessor which is mounted on the circuit board 216 is programmable and includes the logic to control the system 200. All the devices electrically connected to the circuit board 216 as described in this art provides either input to or is operated via outputs from the circuit board 216 and its microprocessor. The logic includes failure algorithms which are indicated by a light emitting diode 195. Light emitting diode 194 is used to indicate the auto/manual status of the system.

The circuit board 216 and its microprocessor receives signals from the main operator panel 217 or the alternate operating panel 169 indicating the desired operation. Each panel allows for the automatic raise or lower cycle to be initiated by activating the raise or lower buttons respectively. A stop button is also included on each operator panel 217 and 169 to allow for the immediate stopping of either automatic cycle. The control circuitry uses the indication as above-mentioned from the main operator panel 217 and the alternate operating panel 169 to undertake the necessary high current voltage switching to operate the system from the off to either the raise or lower modes. In effect the voltage as fed through the dual conductor 172 to the electric motor 201 is the battery voltage for the raise mode with the polarity being reversed across the dual conductor 172 and the electric motor 201 for the lower mode.

In this embodiment the control circuitry ensures the electric motor 23 current is limited to a set value. If the load is such that the electric motor 201 attempts to use excessive current the logic of the microprocessor will de-energize the voltage being feed to dual conductor 172. The supply will not be re-energized until both a short time delay has passed and the stop button of the main or alternate operator panel 217 and 169 has been operated. Such over current conditions will arise where the end of the stroke of the landing gear legs 4 and 5 has been reached and the electric motor 217 is left operating. Preferably when the landing gear legs are being lowered in high speed the system allows the operator to undertake other routine duties as the overload protection component of the system will stop the motor once the telescoping legs 4 and 5 have engaged the ground. In this embodiment the control circuitry is configured so that the change from high speed to low speed can take place automatically as described elsewhere in these teachings.

From FIG. 15 of this embodiment it can be seen that the control circuitry includes a trailer brake air pressure interlock switch 164. This switch is closed when the brake air pressure drops to a point where the trailer brakes (not illustrated) are positively engaged. The inclusion of this element of the circuit design is optional and at the discretion of the operator as some applications would be hindered by the inclusion of such an interlock.

In an alternative embodiment not illustrated the dual conductor 179 is connected together, that is, electrically bridged out. This allows for the brake air pressure interlock switch 164 to be eliminated from the system.

In this embodiment sensors and actuators are included along with the control circuitry to allow the gear change in the trailer landing gear to be undertaken automatically. The turntable clear interlock switch 165 and the legs up interlock switch 166 are used to sense the completed lower and raise automatic cycles respectively. The solenoids 154 and 155 are used to activate the change in gears within the trailer landing gear gear head 103. This is undertaken when the solenoids 154 and 155 act on the pneumatic valves 240 and 241 respectively. In this embodiment two miniature limit switches 167 and 168 are included which are mounted directly to the circuit board 216. These miniature limit switches 167 and 168 are activated by a gear position activating arm 250. When the miniature limit switches 167 and 168 are not operated then the microprocessor logic understands that the landing gear gear head 103 is in the low speed position. When the miniature limit switches 167 and 168 are both operated then the microprocessor logic understands that the landing gear gear head 103 is in the high speed position. When the miniature limit switch 168 only is operated then the microprocessor logic understands that the landing gear gear head 103 is not in either of the low or high speed positions and if a gear change is not in process then manual intervention may need to be undertaken. This embodiment also sees the main and location operator panels 217 and 169 being of a pressure return membrane button type.

In the embodiment as illustrated in FIGS. 8 to 15 a typical scenario for an automatic legs down cycle is initiated, when the system is not already operating, by the operator momentarily pressing the lower button on either the main operating panel 217 or the alternate operating panel 169 for less than three seconds. This signal is received by the microprocessor which after ensuring the gear head 103 is in the high speed mode via miniature limit switches 167 and 168 then starts the electric motor. The lower legs 4 and 5 are then lowered by the electric motor 201 as elsewhere described. When the landing gear lower legs 4 and 5 become engaged with the ground the electric motor 201 electrical current eventually reaches its preset upper current limit and the electric motor 201 is stopped. It should be noted at this point that in some circumstances the trailer and load may be so insignificant that the electric motor 201 electrical current preset upper limit is not reached and the landing gear lower legs 4 and 5 can continue to be lowered in the high speed mode. The electric solenoid 154 is energized to activate the pneumatic valve 240. This valve passes pressurized air to the sub-chamber 235 to effect a gear change from high speed to low speed. The electric motor is pulsed in the raise direction to ensure meshing of the non synchronous gears in the gear head 103. When the low speed gears are engaged which is acknowledged via the miniature limit switches 167 and 168 the electric motor 201 is again energized to continue the lower legs 4 and 5 on their downward path thus raising the trailer. The automatic lower cycle is concluded on reaching one of three conditions:

The first condition being the electric motor 201 current has again reached the preset upper limit.

The second condition being that the turntable clear interlock switch 165 has been activated.

The third condition is that stop or raise buttons on either the main operating panel 217 or the alternate operating panel 169 has been operated.

The automatic raise cycle is activated, when the system is not already operating, and the raise button of either the main operating panel 217 or the alternate operating panel 169 is momentarily activated for less than three seconds. This signal is received by the microprocessor which after ensuring the gear head 103 is in the low speed mode via miniature limit switches 167 and 168 then starts the electric motor. The lower legs 4 and 5 are then raised by the electric motor 201 as elsewhere described. When and the turntable clear interlock switch 165 is deactivated and the landing gear lower legs 4 and 5 become clear of the ground the electric motor 201 electrical current eventually drops to its preset lower current limit then the electric motor 201 is stopped. The electric solenoid 55 is energized to activate the pneumatic valve 241. This valve passes pressurized air to the sub-chamber 236 to effect a gear change from low speed to high speed. The electric motor is pulsed in the raise direction to ensure meshing of the non synchronous gears in the gear head 103. When the high speed gears are engaged which is acknowledged via the miniature limit switches 167 and 168 the electric motor 201 is again energized to continue the lower legs 4 and 5 on their upward path thus lowering the trailer. The automatic raise cycle is concluded on reaching one of three conditions:

The first condition being the electric motor 201 current has reached the preset upper limit.

The second condition being that the legs up interlock switch 166 has been activated.

The third condition is that stop or lower buttons on either the main operating panel 217 or the alternate operating panel 169 has been operated.

In this second embodiment there will be times when the landing gear lower leg 4 and 5 extension needs to be adjusted. This is achieved by holding the raise or lower buttons of either the main operator panel 217 or the alternate operator panel 169 for a period greater that three seconds. The logic of the microprocessor will recognize this holding of the raise or lower buttons and not continue in an automatic mode but only raise or lower the legs respectively for the period that the raise or lower buttons are activated. Gear change can still be undertaken manually and is effected by the operator manually acting on the system 200 to effect the axially displacement about the drive shaft 13 of the system 200 relative to the trailer landing gear.

Figure 16:
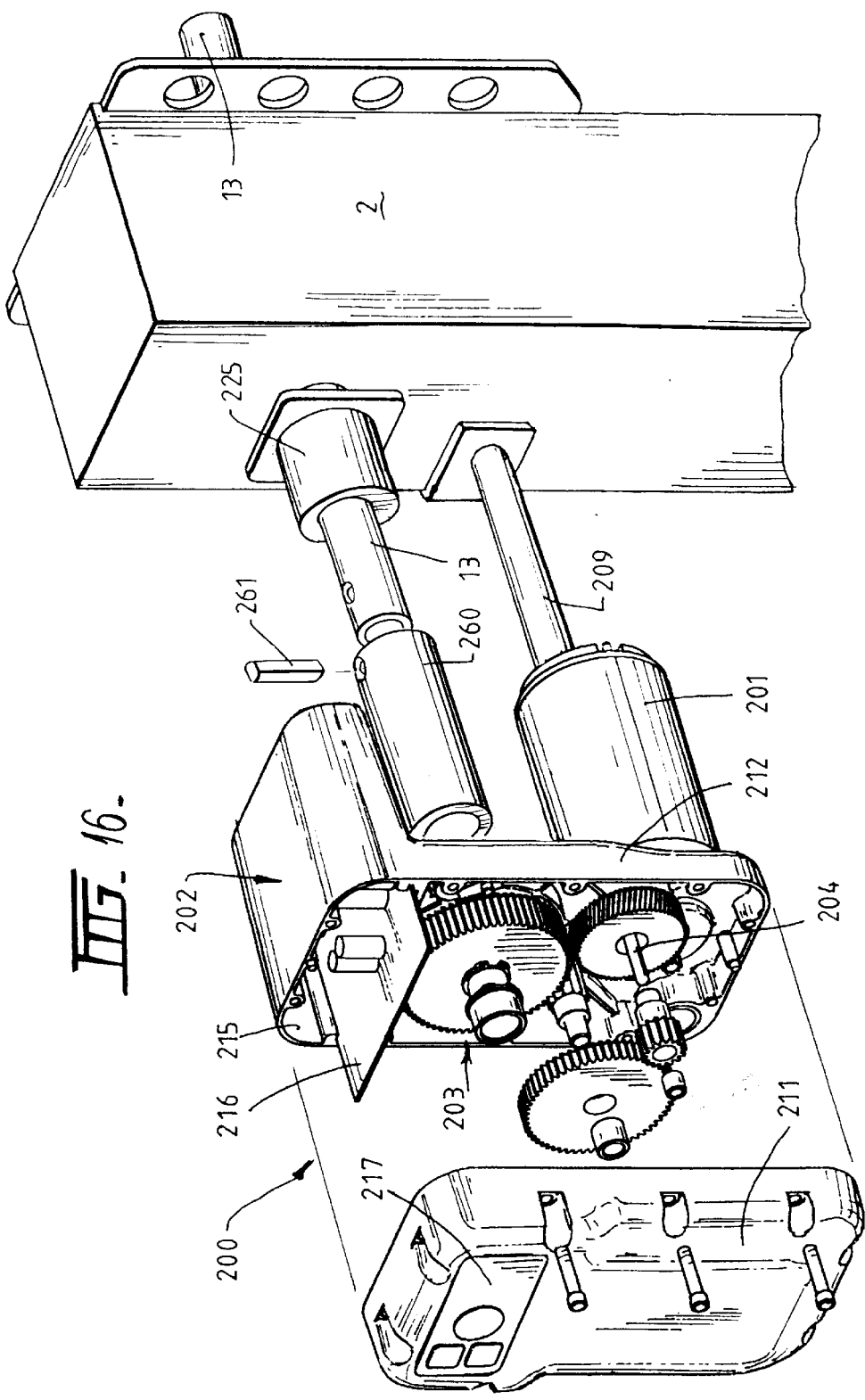
FIG. 16 is an exploded perspective view of a simplified demountable drive system in accordance with a third embodiment.
Figure 17:
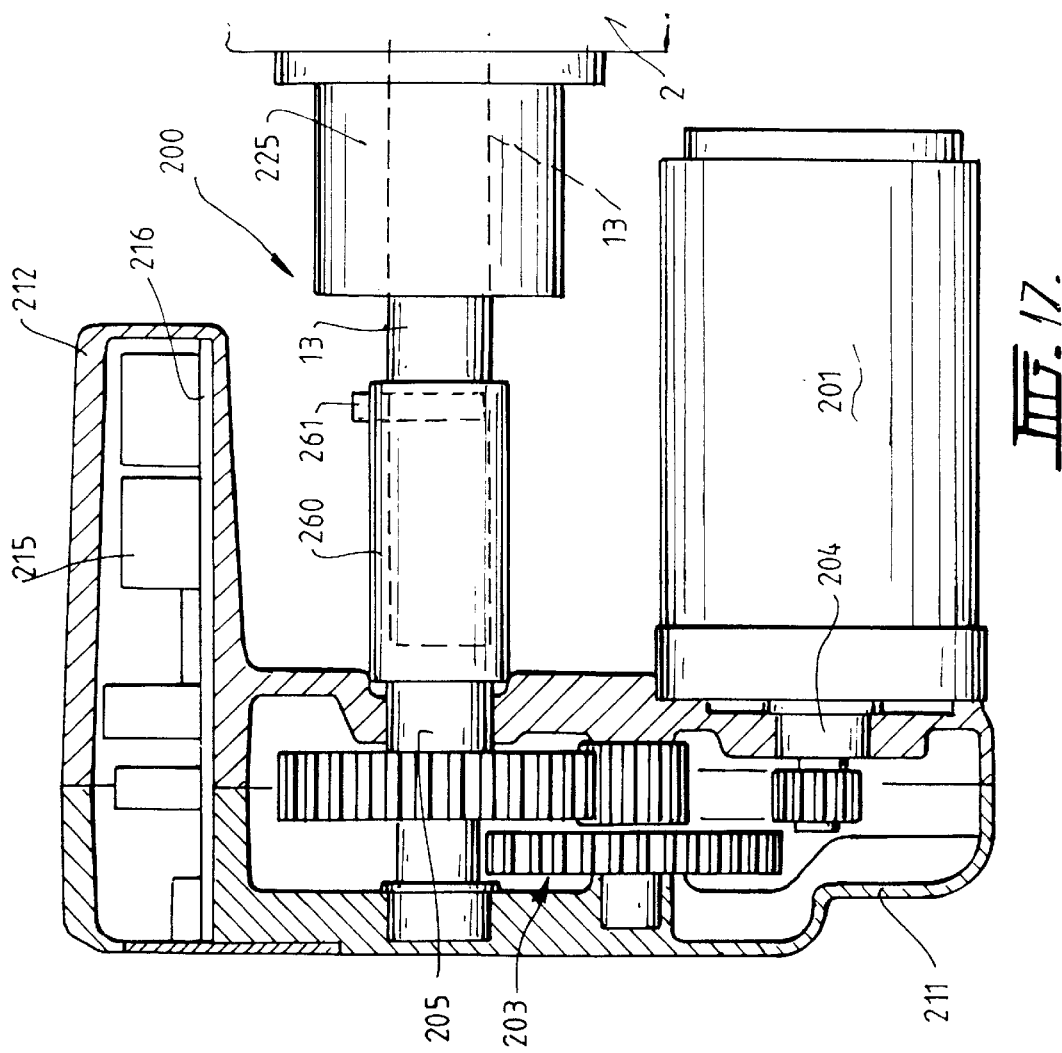
FIG. 17 is a cross-sectional view of the drive system shown in FIG. 16.

In a third embodiment illustrated in FIGS. 16 and 17 a simplified mountable drive mechanism is illustrated. Whilst manually operated gear changes were contemplated earlier in this document, the third embodiment provides a simplified arrangement of this concept where the automated means for changing the gear ratios of the landing gear is removed. In this embodiment the speed change of a landing gear is effected manually by pushing or pulling the assembly on the drive shaft 13 to effect the speed change through the gear illustrated in FIG. 3C. As shown in FIG. 16, the output shaft 13 of the landing gear is concentrically located in a sleeve 260 which is in turn held to the shaft 13 by a locking pin 261. Thus the output of the gear box 203 directly drives the shaft 13 of the landing gear. The pinned arrangement means that a lateral push on the whole assembly displaces the shaft 13 inwards or outwards to change the gear ratio through the gearing shown in FIG. 3C. As in the embodiment shown in FIG. 8, the lower face of the housing 202 has a projecting spigot that is a sliding fit within the steel rod 209 that constitutes the torque arm. The pinned interconnection between the output 260 of the gear box 203 of the drive mechanism and the shaft 13 of the landing gear allows the unit to be readily demountable. This feature also allows the conventional crank handle to be readily reinstated in the event of a breakdown or loss of power.

A further feature of the embodiment of FIGS. 16 and 17 is the use of a two speed electric motor. By use of eccentric brushes a high speed but lower torque output can be produced from the motor. The motor switches to a lower speed and higher torque on demand so that when there is no load on the landing gear the electric motor automatically selects the higher speed. As the load on the landing gear increases the motor switches to the higher torque and lower speed mode.

The assembly illustrated in FIGS. 16 and 17 includes the motor 201, a gearbox 203, and an electronic controller. The gearbox 203 has an output shaft 240 and a control panel 217 on the front of the housing 202 of the assembly. A torque arm 209 projects from the rear of the assembly to be connected to the landing gear.

To support the diverse functionality of the powered trailer jacking system an electronic microprocessor is incorporated as part of the control electronic circuitry. The microprocessor and the control circuitry are mounted within the drive assembly housing on a purpose designed printed circuit board.

The supply from and to the battery and to the electric motor is via short but large diameter electrical conductors. This minimizes the voltage drop between the battery and the electrical motor. These conductors enter the housing through seals and are soldered to the printed circuit board. A thermally acting fuse is located inline with this heavy duty conductor as it connects to the battery to avoid excessive currents in the event of misuse or failure of any one of the components of the system.

Electrical relays are used to switch the large currents from the battery to the electric drive motor. The relays are controlled by the microprocessor and are mounted on the printed circuit board.

The battery voltage is maintained with the incorporation of a purposed designed trickle charge circuit fed from the existing trailer electrical wiring system. The input voltage can vary from 10 to 30 volts. Current is limited to a few amps to minimize any effects on the trailer wiring system. Two small diameter conductors are utilized to carry this charging current from the trailer wiring system to the printed circuit board. These conductors are soldered to the printed circuit board.

The electric motor is protected from excessive current and temperature conditions. The circuit includes a printed circuit board mounted resistor coupled to an analogue to digital converter to measure the current flow to the motor. In some instances this current related signal is used to control an element of an automatic cycle. In other circumstances it prevents excessive and damaging currents passing to the motor and its associated control circuit elements. A thermal resistor is used to sense the temperature of the motor with its resistance monitored to assess when the motor temperature has reached an unacceptable level. At preset current and temperature limits the motor is de-energized. The electronic circuit also protects against the inadvertent reverse polarity connection of either the battery or the charging supply voltages.

The circuit is so configured to minimize the quiescent current drain when the product is idle to ensure that the battery is not discharged in the event the system is idle for extended periods and no charging supply voltage is connected.

Input to the microprocessor is via membrane electrical switch panels. The main panel is located on the face of the device and an alternate panel is mounted on the opposite side of the trailer. The panels are identical in function. The main panel additionally include LEDs (light emitting diodes) to signal a fault condition and to indicate the battery charging system is functional. The panels have switches that enable auto functions that allow the legs to be lowered to the ground, raised to the travelling position and "inched" without the operator required to be in attendance. There is a stop button on each panel in the event of a safety issue where the legs may need to be stopped in an emergency or any of the auto functions needs to be halted.

The stop button deactivates any auto operation. The auto lower switch activates an auto lowering of the legs which only stops when the motor current increases to a preset level. This will normally happen when the leg comes in contact with the ground. The auto raise switch activates an auto raising of the legs which only stops when the motor current increases to a preset level. This will normally happen when the leg is fully raised and hits the upper limit of travel. The inching switch will lower the legs for a preset time. Multiple sequential activation of the inching switch results in corresponding multiple time continuos operation. In each auto mode the default operation is to run the motor in high speed (lower torque). The controller continually senses the current and at a preset upper current limit the controller will change to the low speed function of the electric motor to provide the additional torque that may be required. In the event that the unit is operating in the low motor speed mode and the current drops to a preset lower level then the controller will undertake to switch the electric motor to the high speed mode. Time delays are utilized in the above-mentioned switching to ensure the motor is not continually being switched between the two different motor speeds.

For safety reasons an air pressure switch is used to sense the positive operation of the trailer air brakes. The unit is interlocked to ensure that the powered trailer jacking system cannot lower whilst the brakes are off.

What is claimed is:

1. A demountable drive mechanism for landing gear of a semi-trailer, the landing gear including legs that are extendable and retractable by rotation of a drive shaft through a gear mechanism having a changeable ratio, the drive shaft being axially displaceable to change the ratio of the gear mechanism, the drive mechanism being directly secured to the drive shaft and comprising an electric motor having an output shaft adapted to be coupled to the drive shaft, the drive mechanism further including an adjustable torque arm for engaging the landing gear so that the electric motor can impart torque to the drive shaft, drive means acting between the electric motor and the landing gear for axially displacing the drive shaft to change the gear ratio, and control means for controlling operation of the electric motor and drive means.

2. A demountable drive mechanism according to claim 1 wherein the control means senses changes in current, to start or stop or effect a change of gear ratio, the change in current being dependent on load changes on the drive mechanism.

3. The demountable drive mechanism according to claim 1 wherein the torque arm comprises a flange adapted to engage the landing gear, the flange being coupled to a sleeve movable axially relative to the flange, whereby engagement of the flange against the landing gear absorbs torque on to the sleeve imparted by the electric motor.

4. The demountable drive mechanism according to claim 1 wherein the electric motor is powered by at least one battery carried by the trailer.

5. The demountable drive mechanism according to claim 1 wherein the electric motor is driven by a power source of a prime mover that is adapted to be attached to the semi trailer.

6. The demountable drive mechanism according to claim 1 wherein the control means includes a sensor to determine air pressure in a braking system of the trailer to ensure that trailer brakes of the braking system are on during operation of the drive mechanism.

7. The demountable drive mechanism according to claim 1 wherein the torque arm allows a degree of relative radial movement between the electric motor and the drive shaft to ensure meshing of the gears as the drive shaft is axially displaced to effect a change of ratio.

8. The demountable drive mechanism according to claim 1 wherein the drive means comprises at least one solenoid mounted between the electric motor and the landing gear, actuation of the solenoid being adapted to axially move the electric motor and drive shaft of the landing gear to change the gear ratio.

9. The demountable drive mechanism according to claim 1 wherein the drive means comprises a pneumatic actuator for displacing the electric motor relative to the landing gear to axially displace the driveshaft.

10. The demountable drive mechanism according to claim 1 further comprising a pneumatic piston and cylinder assembly coupled to an air reservoir via valves whereby operation of the valve pressurizes either side of the piston to cause relative displacement of the piston relative to the cylinder, the drive shaft being coupled to either the piston or cylinder to be displaced relative to the landing gear to effect speed change.

11. The demountable drive mechanism according to claim 10 wherein the valves are biased to a neutral position in which both sides of the piston are vented to atmosphere to facilitate manual override.

12. The demountable drive mechanism according to claim 11 wherein each side of the piston is vented through a narrow bore to delay escape of pressurized air to act as a damper against the movement between the piston and cylinder.

13. The demountable drive mechanism according to claim 1 further comprising limit switches providing an indication of at least one of the following parameters:
   a) upper position of landing gear in 'up' position,
   b) lower position of landing gear in 'down' position,
   c) trailer clear of an associated prime mover,
   d) limit positions of axial displacement of drive shaft to effect change gear ratio.

14. A demountable drive mechanism for landing gear of a semi-trailer, the landing gear including legs that are extendable and retractable by rotation of a drive shaft through a gear mechanism having a changeable ratio, the drive shaft being axially displaceable to change the ratio of the gear mechanism, the drive mechanism being adapted to be directly secured to and supported by the drive shaft, the drive mechanism comprising an electric motor adapted to be coupled to the drive shaft, the drive mechanism including an axially adjustable torque arm for engaging the landing gear so that the electric motor can impart torque to the drive shaft, the drive mechanism being axially displaceable to axially displace the drive shaft to change the ratio of the gear mechanism, and the drive mechanism further including control means to control operation of the electric motor.

15. The demountable drive mechanism according to claim 14 wherein the electric motor is configured to either provide on demand low torque at high speed or high torque at low speed.

16. The demountable drive mechanism according to claim 14 wherein the control means senses changes in current, to start or stop the drive mechanism, the change in current being dependent on load changes on the drive mechanism.

17. The demountable drive mechanism according to claim 14 wherein the torque arm comprises a flangefor engaging the landing gear, the flange being coupled to a sleeve movable axially relative to the flange, whereby engagement of the flange against the landing gear absorbs torque on the sleeve imparted by the electric motor.

18. The demountable drive mechanism according to claim 14 wherein the electric motor is powered by at least one battery carried by the trailer.

19. The demountable drive mechanism according to claim 14 wherein the electric motor is driven by the power source of a prime mover that is adapted to be attached to the semi trailer.

20. The demountable drive mechanism according to claim 14 wherein the control means includes a sensor to determine air pressure in a braking system of the trailer to ensure that associated trailer brakes of the braking system are on during operation of the drive mechanism.

21. The demountable drive mechanism according to claim 14 wherein the electric motor has an output shaft that is coupled to the drive shaft of the landing gear through a gear box.

22. The demountable drive mechanism according to claim 14 wherein the torque arm allows a degree of relative radial movement between the electric motor and the drive shaft to ensure meshing of the gears as the drive shaft is axially displaced to effect a change of ratio.

23. The demountable drive mechanism according to claim 14 further comprising limit switches providing an indication of at least one of the following parameters:
   a) upper position of landing gear in 'up' position,
   b) lower position of landing gear in 'down' position,
   c) trailer clear of an associated prime mover,
   d) limit positions of axial displacement of drive shaft to effect change gear ratio.

24. A demountable drive mechanism for landing gear of a semi-trailer, the landing gear including legs that are extendable and retractable by rotation of a drive shaft through a gear mechanism having a changeable ratio, the drive shaft being axially displaceable to change the ratio of the gear mechanism, the drive mechanism comprising a two speed electric motor adapted to be demountably coupled to and supported by the drive shaft of the landing gear via a gearbox, the drive mechanism including an axially extendable torque arm for engaging the landing gear so that the electric motor can impart torque to the drive shaft, and control means to control operation of the electric motor, the drive mechanism being axially displaceable to axially displace the drive shaft to change the ratio of the gear mechanism.

* * * * *